United States Patent
Schöller et al.

(10) Patent No.: US 11,072,677 B2
(45) Date of Patent: Jul. 27, 2021

(54) COMB POLYMERS COMPRISING IMIDE FUNCTIONALITY

(71) Applicant: Evonik Operations GmbH, Essen (DE)

(72) Inventors: Katrin Schöller, Bad Soden (DE); Jennifer Holtzinger, Frankfurt am Main (DE); Fabian Ziegler, Darmstadt (DE); Klaus Schimossek, Bensheim (DE); Frank Lauterwasser, Kretz (DE)

(73) Assignee: Evonik Operations GmbH, Essen (DE)

( * ) Notice: Subject to any disclaimer, the term of this patent is extended or adjusted under 35 U.S.C. 154(b) by 86 days.

(21) Appl. No.: 16/628,331

(22) PCT Filed: Jul. 12, 2018

(86) PCT No.: PCT/EP2018/068908
§ 371 (c)(1),
(2) Date: Jan. 3, 2020

(87) PCT Pub. No.: WO2019/012031
PCT Pub. Date: Jan. 17, 2019

(65) Prior Publication Data
US 2020/0216596 A1 Jul. 9, 2020

(30) Foreign Application Priority Data

Jul. 14, 2017 (EP) .................................... 17181337

(51) Int. Cl.
*C10M 169/04* (2006.01)
*C08F 290/04* (2006.01)
(Continued)

(52) U.S. Cl.
CPC ............ *C08F 290/048* (2013.01); *C08F 8/32* (2013.01); *C10M 169/041* (2013.01);
(Continued)

(58) Field of Classification Search
CPC ... C08F 290/048; C08F 8/32; C10M 169/041; C10M 2203/1025; C10M 2209/084;
(Continued)

(56) References Cited

U.S. PATENT DOCUMENTS 5,565,130 A  10/1996  Omeis et al.
5,597,871 A  1/1997  Auschra et al.
(Continued)

FOREIGN PATENT DOCUMENTS

WO  2007/003238  1/2007
WO  2010/102903  9/2010
(Continued)

OTHER PUBLICATIONS

International Search Report dated Sep. 21, 2018 in PCT/EP2018/068908.
Written Opinion dated Sep. 21, 2018 in PCT/EP2018/068908.

*Primary Examiner* — Ellen M McAvoy
(74) *Attorney, Agent, or Firm* — Grüneberg and Myers PLLC

(57) ABSTRACT

Selected comb polymers include specified amounts of macromonomer and imide functionalization. Further, a method is useful for the preparation of such comb polymers. Lubricant compositions including such comb polymers are useful for reducing wear and fuel consumption of lubricant compositions, especially of engine oil (EO) compositions.

19 Claims, 1 Drawing Sheet

(51) Int. Cl.
  *C08F 8/32* (2006.01)
  *C10N 20/00* (2006.01)
  *C10N 30/00* (2006.01)
  *C10N 60/00* (2006.01)
  *C10N 20/04* (2006.01)
  *C10N 30/06* (2006.01)
  *C10N 40/25* (2006.01)

(52) U.S. Cl.
  CPC ............... *C10M 2203/1025* (2013.01); *C10M 2209/084* (2013.01); *C10M 2209/086* (2013.01); *C10M 2217/044* (2013.01); *C10N 2020/04* (2013.01); *C10N 2020/071* (2020.05); *C10N 2030/06* (2013.01); *C10N 2030/54* (2020.05); *C10N 2040/25* (2013.01); *C10N 2060/09* (2020.05)

(58) Field of Classification Search
  CPC ...... C10M 2209/086; C10M 2217/044; C10N 2020/071; C10N 2030/54; C10N 2060/09; C10N 2020/04; C10N 2030/06; C10N 2040/25
  See application file for complete search history.

(56) References Cited

U.S. PATENT DOCUMENTS

| | | | |
|---|---|---|---|
| 9,434,903 B2 | 9/2016 | Eisenberg et al. | |
| 10,633,610 B2* | 4/2020 | Scholler | C08F 290/048 |
| 10,731,097 B2* | 8/2020 | Scholler | C08C 19/28 |
| 10,920,164 B2* | 2/2021 | Klein | C08F 290/048 |
| 10,941,368 B2* | 3/2021 | Yuki | C10M 161/00 |
| 2008/0026964 A1 | 1/2008 | Srinivasan et al. | |
| 2008/0194443 A1 | 8/2008 | Stohr et al. | |
| 2010/0190671 A1 | 7/2010 | Stoehr et al. | |
| 2011/0306533 A1 | 12/2011 | Eisenberg et al. | |
| 2013/0079265 A1 | 3/2013 | Eisenberg et al. | |
| 2014/0005084 A1 | 1/2014 | Eisenberg et al. | |
| 2016/0097017 A1 | 4/2016 | Eisenberg et al. | |
| 2019/0203148 A1* | 7/2019 | Scholler | C10M 105/36 |
| 2019/0211281 A1 | 7/2019 | Imaizumi et al. | |
| 2019/0300808 A1* | 10/2019 | Sondjaja | C10M 107/28 |

FOREIGN PATENT DOCUMENTS

| | | |
|---|---|---|
| WO | 2012/156256 | 11/2012 |
| WO | 2014/170169 | 10/2014 |

\* cited by examiner

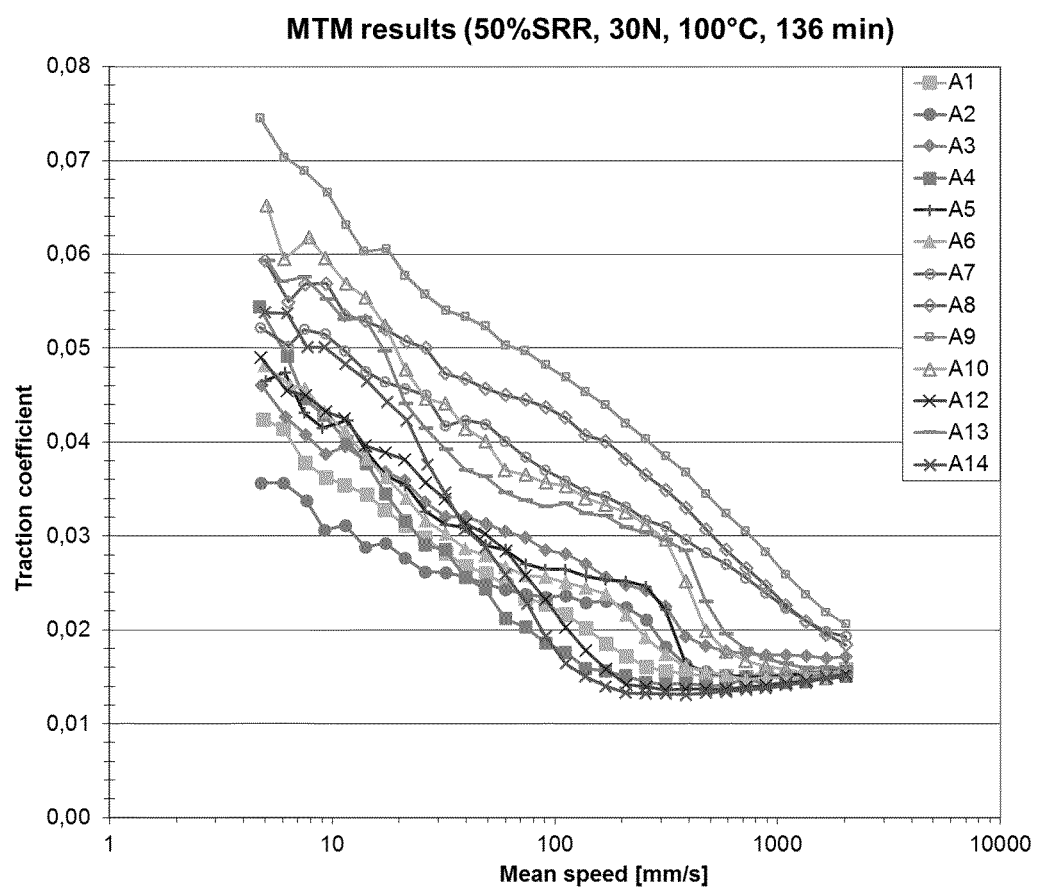

ional Application No. PCT/EP2018068908, filed on
COMB POLYMERS COMPRISING IMIDE FUNCTIONALITY

CROSS-REFERENCE TO RELATED APPLICATIONS

This application is a National Stage entry under § 371 of International Application No. PCT/EP2018068908, filed on Jul. 12, 2018, and which claims the benefit of European Application No. 17181337.1, filed on Jul. 14, 2017. The contents of each application are hereby incorporated by reference in their entireties.

BACKGROUND OF THE INVENTION

Field of the Invention

The present invention is directed to selected comb polymers comprising specified amounts of macromonomer and imide functionalization, their preparation, lubricant compositions comprising such comb polymers and their use for reducing wear and fuel consumption of lubricant compositions, especially of engine oil (EO) compositions.

Discussion of the Background

There is great interest to reduce the fuel consumption of modern engines in order to limit the $CO_2$ emissions from vehicles. Today, mainly two techniques are used to improve fuel economy. One is the reduction of oil viscosity by moving to lower engine oil viscosity grades. The second is the use of special friction modifier additives. The working mechanism of friction modifiers is either the reduction of friction within the boundary regimes of the engine or by extending the hydrodynamic regime to lower viscosities. Especially, when very low viscous base oils like 0W20, 0W16 or 0W12 are used, where only relatively small amounts of viscosity index improvers are added, the fuel saving effect from friction modifiers becomes more and more important.

Lubricant properties are typically improved by the addition of additives to lubricating oils.

Comb polymers have been shown to lead to very low viscous engine oils with improved fuel economy, but there is an ongoing need to improve fuel economy even more. The main mechanism of the fuel saving properties of combs are their superior viscometric properties in a typical engine oil or driveline formulation.

The comb polymer technology in general and their use as viscosity index improvers is already known (US 2008/0194443, US 2010/0190671 and WO 2014/170169).

U.S. Pat. Nos. 5,565,130 and 5,597,871, for example, disclose using comb polymers comprising polybutadiene-derived macromonomers as viscosity index improvers. However, no effect on friction reduction is disclosed therein.

WO 2007/003238 A1 describes oil-soluble comb polymers based on polyolefin-based macromonomers, especially polybutadiene-based methacrylic esters, and C1-C10 alkyl methacrylates. The comb polymers can be used as an additive for lubricant oils, in order to improve the viscosity index and shear stability. However, no effect on friction reduction is disclosed therein.

Comb polymers with low amounts of macromonomer and their advantage on fuel economy ($HTHS_{100}$, $KV_{40}$ levels) in engine oils has been described in US 2010/0190671. However, no effect on friction reduction is disclosed therein.

WO 2010/102903 A1 discloses the use of comb polymers as antifatigue additives for transmission, motor and hydraulic oils. However, no effect on friction reduction is disclosed therein.

In contrast to this approach improved fuel economy can also be obtained by the additives in the DI (detergent inhibitor) package. For example, one effect often used by blenders to achieve fuel efficiency is the reduction of friction by adding friction modifiers to the oil formulations. Typical friction modifiers are molybdenum dithiocarbamates (MoDTC) and their derivatives.

The approaches detailed above do lead to a reduction in the overall fuel consumption. However, there is still the permanent desire to improve fuel consumption even further.

It was therefore the aim of the present invention to modify a comb polymer viscosity improver by introducing a functionality which at the same time positively influences the viscometric properties of the comb polymers while also reducing friction.

Several publications exist describing dispersant polymers in general. Dispersant polymers are in most cases standard polymers with small amounts of functional monomers that add dispersant activity (the ability to disperse engine soot etc.) to the products. In most cases conventional polymers like olefin copolymers (OCPs) or polyalkyl (meth)acrylates (PAMAs) are used as base polymers. Different dispersant functions are described, for example functional N-containing monomers like N-vinyl-pyrrolidine (NVP) or dimethylaminoethyl methacrylate (DMAEMA), and also imide functions in combination with OCPs or PAMAs. The functional monomers can either be copolymerized or grafted on the already existing polymer. In some cases it was shown that the grafting approach leads to improved friction reduction as compared to the copolymerization approach (WO 2012/013432).

It was now surprisingly found that polyalkyl(meth)acrylate based comb polymers comprising a small amount of imide functionality can contribute to low friction coefficients and, additionally, lead to improved fuel economy of lubricating oil compositions.

It was found that by using a base polymer with a specified composition and introducing the imide by grafting approach it is possible to significantly reduce the friction coefficient of lubricating oil compositions, especially 0W20 engine oil formulations.

SUMMARY OF THE INVENTION

A first object of the present invention is directed to a polyalkyl(meth)acrylate based comb polymer consisting of a base polymer A and units B which are grafted thereon, wherein the base polymer A comprises:

(a) 10 to 25% by weight of repeating units derived from esters of (meth)acrylic acid and a hydroxylated hydrogenated polybutadiene;

(b) 0% to 2% by weight of repeating units derived from methyl (meth)acrylate;

(c) 60% to 80% by weight of repeating units derived from butyl (meth)acrylate, preferably n-butyl methacrylate;

(d) 0% to 15% by weight of repeating units derived from $C_{10-20}$-alkyl (meth)acrylates, preferably $C_{12-14}$-alkyl methacrylate; and (e) 0% to 2% by weight of repeating units derived from styrene monomers having 8 to 17 carbon atoms, preferably styrene, the amount of each component (a) to (e) being based on the total composition of the polyalkyl(meth)acrylate based comb polymer; and the grafted units B comprise repeating units prepared from:

(f) 1% to 2.5% by weight of repeating units derived from polar unsaturated monomer selected from the group consisting of maleic acid, maleic acid anhydride, methyl maleic acid anhydride, maleic acid monoester and maleic acid diester; and (g) 2% to 5% by weight of repeating units derived from primary amine of the following general

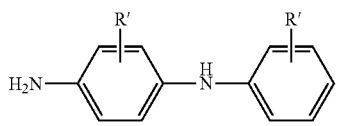

wherein each R' may independently be selected from the group consisting of H and an alkyl radical having 1 to 9 carbon atoms, the amount of each component (f) and (g) being based on the total composition of the polyalkyl(meth)acrylate based comb polymer.

BRIEF DESCRIPTION OF DRAWING

FIG. 1 shows MTM test results (50% SRR, 30N, 100° C., 136 min).

DETAILED DESCRIPTION OF THE INVENTION

A preferred first object of the present invention is directed to a polyalkyl(meth)acrylate based comb polymer consisting of a base polymer A and units B which are grafted thereon, wherein the base polymer A comprises:

(a) 10 to 15% by weight of repeating units derived from esters of (meth)acrylic acid and a hydroxylated hydrogenated polybutadiene;

(b) 0% to 2% by weight of repeating units derived from methyl (meth)acrylate);

(c) 65% to 76% by weight of repeating units derived from butyl (meth)acrylate, preferably n-butyl methacrylate;

(d) 5% to 16% by weight of repeating units derived from $C_{10-20}$-alkyl (meth)acrylates, preferably $C_{12-14}$-alkyl methacrylate; and (e) 0% to 2% by weight of repeating units derived from styrene monomers having 8 to 17 carbon atoms, preferably styrene, the amount of each component (a) to (e) being based on the total composition of the polyalkyl(meth)acrylate based comb polymer; and the grafted units B comprise repeating units prepared from:

(f) 1% to 2.5% by weight of repeating units derived from polar unsaturated monomer selected from the group consisting of maleic acid, maleic acid anhydride, methyl maleic acid anhydride, maleic acid monoester and maleic acid diester; and (g) 2% to 5% by weight of repeating units derived from primary amine of the following general formula (I)

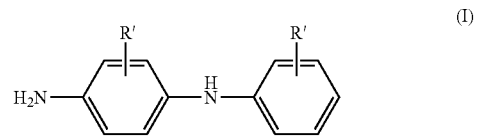

wherein each R' may independently be selected from the group consisting of H and an alkyl radical having 1 to 9 carbon atoms, the amount of each component (f) and (g) being based on the total composition of the polyalkyl(meth)acrylate based comb polymer.

In a preferred embodiment, the proportions of components (a) to (g) add up to 100% by weight.

The weight-average molecular weight $M_w$ of the polyalkyl(meth)acrylate based comb polymers according to the present invention is preferably in the range from 200.000 to 600.000 g/mol, and more preferably from 300.000 to 500.000 g/mol.

Preferably, the polyalkyl(meth)acrylate based comb polymers according to the present invention have a polydipersity index (PDI) $M_w/M_n$ in the range of 1 to 6, more preferably in the range of from 3 to 5.

$M_w$ and $M_n$ are determined by size exclusion chromatography (SEC) using commercially available polymethylmethacrylate (PMMA) standards. The determination is effected by gel permeation chromatography with THF as eluent.

A comb polymer in the context of the present invention comprises a first polymer, which is also referred to as backbone or main chain, and a multitude of further polymers which are referred to as side chains and are bonded covalently to the backbone. In the present case, the backbone of the comb polymer is formed by the interlinked unsaturated groups of the monomers mentioned. The ester groups of the (meth)acrylic esters and the phenyl radicals of the styrene monomers form the side chains of the comb polymer.

The term "(meth)acrylic acid" refers to acrylic acid, methacrylic acid and mixtures of acrylic acid and methacrylic acid; methacrylic acid being preferred. The term "(meth)acrylate" refers to esters of acrylic acid, esters of methacrylic acid or mixtures of esters of acrylic acid and methacrylic acid; esters of methacrylic acid being preferred.

The term "butyl (meth)acrylate" refers to butyl methacrylate and/or butyl acrylate, more preferably n-butyl methacrylate and/or n-butyl acrylate; n-butyl methacrylate being preferred.

The term "$C_{10-20}$ alkyl (meth)acrylates" refers to esters of (meth)acrylic acid and straight chain or branched alcohols having 10 to 20 carbon atoms. The term "$C_{10-20}$ alkyl (meth)acrylates" encompasses individual (meth)acrylic esters with an alcohol of a particular length, and likewise mixtures of (meth)acrylic esters with alcohols of different lengths.

Suitable $C_{10-20}$ alkyl (meth)acrylates include, for example, 2-butyloctyl (meth)acrylate, 2-hexyloctyl (meth)acrylate, decyl (meth)acrylate, iso-decyl (meth)acrylate, 2-butyldecyl (meth)acrylate, 2-hexyldecyl (meth)acrylate, 2-octyldecyl (meth)acrylate, undecyl (meth)acrylate, 5-methylundecyl (meth)acrylate, dodecyl (meth)acrylate, 2-methyldodecyl (meth)acrylate, 2-hexyldodecyl (meth)acrylate, 2-octyldodecyl (meth)acrylate, tridecyl (meth)acrylate, 5-methyltridecyl (meth)acrylate, tetradecyl (meth)acrylate, 2-decyltetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth)acrylate, 5-ethyloctadecyl (meth)acrylate, octadecyl (meth)acrylate, nonadecyl (meth)acrylate, eicosyl (meth)acrylate, cetyleicosyl (meth)acrylate and stearyleicosyl (meth)acrylate.

Preferred are $C_{10-15}$ alkyl (meth)acrylates and particularly preferred are methacrylic esters of a linear $C_{12-14}$ alcohol mixture ($C_{12-14}$ alkyl methacrylate).

The $C_{10-15}$ alkyl methacrylates for use in accordance with the invention are esters of methacrylic acid and alcohols having 10 to 15 carbon atoms. The term "$C_{10-15}$ alkyl methacrylates" encompasses individual methacrylic esters with an alcohol of a particular length, and likewise mixtures of methacrylic esters with alcohols of different lengths.

The suitable $C_{10-15}$ alkyl methacrylates include, for example, decyl methacrylate, undecyl methacrylate, 5-methylundecyl methacrylate, dodecyl methacrylate, 2-methyldodecyl methacrylate, tridecyl methacrylate, 5-methyltridecyl methacrylate, tetradecyl methacrylate and/or pentadecyl methacrylate.

The term "alkyl radical having 1 to 9 carbon atoms" encompasses methyl, ethyl, n-propyl, iso-propyl, n-butyl, iso-butyl, tert-butyl, pentyl, hexyl, heptyl, octyl and nonyl.

The hydroxylated hydrogenated polybutadiene according to the present invention has a number-average molar mass $M_n$ of 4000 to 6000 g/mol, preferably 4500 to 5000 g/mol. Because of their high molar mass, the hydroxylated hydrogenated polybutadienes can also be referred to as macroalcohols in the context of this invention.

The number-average molar mass $M_n$ is determined by size exclusion chromatography using commercially available polybutadiene standards. The determination is effected to DIN 55672-1 by gel permeation chromatography with THF as eluent.

Preferably, the hydroxylated hydrogenated polybutadiene has a hydrogenation level of at least 99%. An alternative measure of the hydrogenation level which can be determined on the copolymer of the invention is the iodine number. The iodine number refers to the number of grams of iodine which can be added onto 100 g of copolymer. Preferably, the copolymer of the invention has an iodine number of not more than 5 g of iodine per 100 g of copolymer. The iodine number is determined by the Wijs method according to DIN 53241-1:1995-05.

Preferred hydroxylated hydrogenated polybutadienes can be obtained according to GB 2270317.

Some hydroxylated hydrogenated polybutadienes are also commercially available. The commercially hydroxylated hydrogenated polybutadienes include, for example, a hydrogenated polybutadiene OH-functionalized to an extent of about 98% by weight (also called olefin copolymer OCP) having about 50% each of 1,2 repeat units and 1,4 repeat units, of $M_n$=4200 g/mol, from Cray Valley (Paris), a daughter company of Total (Paris).

Preference is given to monohydroxylated hydrogenated polybutadienes. More preferably, the hydroxylated hydrogenated polybutadiene is a hydroxyethyl- or hydroxypropyl-terminated hydrogenated polybutadiene. Particular preference is given to hydroxypropyl-terminated polybutadienes.

These monohydroxylated hydrogenated polybutadienes can be prepared by first converting butadiene monomers by anionic polymerization to polybutadiene. Subsequently, by reaction of the polybutadiene monomers with ethylene oxide or propylene oxide, a hydroxy-functionalized polybutadiene can be prepared. This hydroxylated polybutadiene can be hydrogenated in the presence of a suitable transition metal catalyst.

The esters of (meth)acrylic acid according to the present invention and a hydroxylated hydrogenated polybutadiene described are also referred to as macromonomers in the context of this invention because of their high molar mass.

The macromonomers according to the invention can be prepared by transesterification of alkyl (meth)acrylates. Reaction of the alkyl (meth)acrylate with the hydroxylated hydrogenated polybutadiene forms the ester of the invention. Preference is given to using methyl (meth)acrylate or ethyl (meth)acrylate as reactant.

This transesterification is widely known. For example, it is possible for this purpose to use a heterogeneous catalyst system, such as lithium hydroxide/calcium oxide mixture (LiOH/CaO), pure lithium hydroxide (LiOH), lithium methoxide (LiOMe) or sodium methoxide (NaOMe) or a homogeneous catalyst system such as isopropyl titanate ($Ti(OiPr)_4$) or dioctyltin oxide ($Sn(OCt)_2O$).

The reaction is an equilibrium reaction. Therefore, the low molecular weight alcohol released is typically removed, for example by distillation.

In addition, the macromonomers can be obtained by a direct esterification proceeding, for example, from (meth)acrylic acid or (meth)acrylic anhydride, preferably under acidic catalysis by p-toluenesulfonic acid or methanesulfonic acid, or from free methacrylic acid by the DCC method (dicyclohexylcarbodiimide).

Furthermore, the present hydroxylated hydrogenated polybutadiene can be converted to an ester by reaction with an acid chloride such as (meth)acryloyl chloride.

Preferably, in the above-detailed preparations of the esters of the invention, polymerization inhibitors are used, for example the 4-hydroxy-2,2,6,6-tetramethylpiperidinooxyl radical and/or hydroquinone monomethyl ether.

The styrene monomers having 8 to 17 carbon atoms for use in accordance with the invention are styrene and substituted styrene. Examples of styrene monomers having 8 to 17 carbon atoms are styrene, substituted styrenes having an alkyl substituent in the side chain, for example alpha-methylstyrene and alpha-ethylstyrene, substituted styrenes having an alkyl substituent on the ring, such as vinyltoluene and p-methylstyrene, halogenated styrenes, for example monochlorostyrenes, dichlorostyrenes, tribromostyrenes and tetrabromostyrenes. Particular preference is given to unsubstituted styrene.

The base polymers A according to the present invention can be prepared by free-radical polymerization and by related methods of controlled free-radical polymerization, for example ATRP (=atom transfer radical polymerization) or RAFT (=reversible addition fragmentation chain transfer).

Standard free-radical polymerization is detailed, inter alia, in Ullmann's Encyclopedia of Industrial Chemistry, Sixth Edition. In general, a polymerization initiator and optionally a chain transfer agent are used for this purpose.

The usable initiators include azo initiators widely known in the technical field, such as AIBN and 1,1-azobiscyclohexanecarbonitrile, and also peroxy compounds such as methyl ethyl ketone peroxide, acetylacetone peroxide, dilauryl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethyl-hexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis (4-tert-butylcyclohexyl) peroxydicarbonate, mixtures of two or more of the aforementioned compounds with one another, and mixtures of the aforementioned compounds with unspecified compounds which can likewise form free radicals. Suitable chain transfer agents are especially oil-soluble mercaptans, for example n-dodecyl mercaptan or 2-mercaptoethanol, or else chain transfer agents from the class of the terpenes, for example terpinolene.

The ATRP method is known per se. It is assumed that this is a "living" free-radical polymerization, but no restriction is intended by the description of the mechanism. In these processes, a transition metal compound is reacted with a compound having a transferable atom group. This involves transfer of the transferable atom group to the transition metal compound, as a result of which the metal is oxidized. This reaction forms a free radical which adds onto ethylenic groups. However, the transfer of the atom group to the transition metal compound is reversible, and so the atom group is transferred back to the growing polymer chain, which results in formation of a controlled polymerization system. It is accordingly possible to control the formation of the polymer, the molecular weight and the molecular weight distribution.

This reaction regime is described, for example, by J.-S. Wang, et al., J. Am. Chem. Soc, vol. 117, p. 5614-5615 (1995), by Matyjaszewski, Macromolecules, vol. 28, p. 7901-7910 (1995). In addition, patent applications WO 96/30421, WO 97/47661, WO 97/18247, WO 98/40415 and WO 99/10387 disclose variants of the above-elucidated ATRP. In addition, the polymers of the invention can also be obtained via RAFT methods, for example. This method is described in detail, for example, in WO 98/01478 and WO 2004/083169.

The polymerization can be conducted under standard pressure, reduced pressure or elevated pressure. The polymerization temperature is also uncritical. In general, however, it is in the range from −20 to 200° C., preferably 50 to 150° C. and more preferably 80 to 130° C.

The polymerization can be conducted with or without solvent. The term "solvent" should be understood here in a broad sense. The solvent is selected according to the polarity of the monomers used, it being possible with preference to use 100N oil, comparatively light gas oil and/or aromatic hydrocarbons, for example toluene or xylene.

The base polymer A is then subsequently functionalized with grafted units B. The units B derived from amine derivatives of a polar ethylenically unsaturated monomer are grafted on the polyalkyl(meth)acrylate. This is preferably obtained by a polymer-analogous reaction after the above-described preparation of a base polymer A. Accordingly, it is possible with preference first to prepare a polymer by the use of reactive polar unsaturated monomers selected from the group consisting of maleic acid, maleic acid anhydride, methyl maleic acid anhydride, maleic acid monoester and maleic acid diester; preferably maleic acid anhydride. The reactive units are further reacted with a primary amine of the general formula (I) as described above. The procedure can be illustrated by the following Scheme 1.

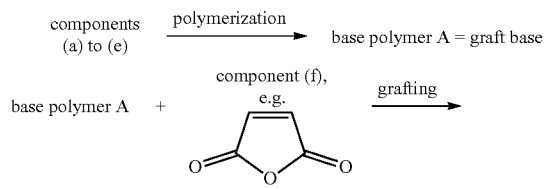

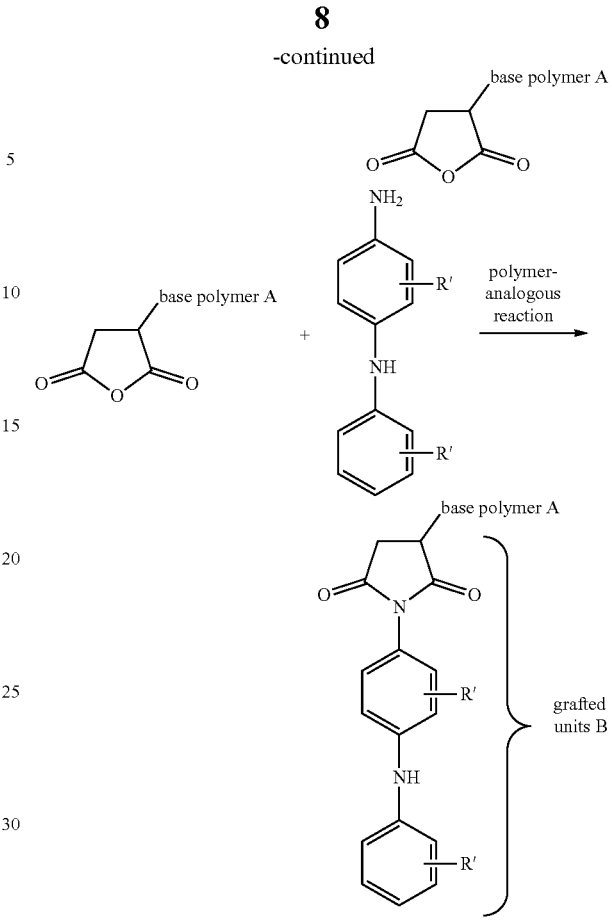

The reaction of the reactive polar unsaturated monomer present in the polymer, preferably of the maleic acid anhydride, with the mentioned primary amines can be effected typically between 40° C. and 180° C., preferably between 80° C. and 180° C. and more preferably between 100° C. and 160° C.

The amine can preferably be added in an equimolar amount to the reactive polar groups, preferably to the anhydride or epoxide groups. If excess amounts of amine are added, it can subsequently be removed from the mixture. In the case of excessively small proportions, reactive groups remain, which can optionally be converted to less reactive groups by addition of small amounts of water.

The amine can be added in pure form to the reaction mixture or in a suitable solvent. Preference is given to polar solvents, especially esters, e.g. butyl acetate or diisononyl adipate (Plastomoll DNA).

According to the nature of the reactive reactant group converted, water may be formed. For example, in the case of use of anhydride groups, water is released, which, in a particular aspect of the present invention, can be removed substantially completely from the reaction mixture, it being possible to drive out water, for example, by means of dry nitrogen. In addition, it is possible to use desiccants. Volatile solvents such as butyl acetate, if used, can be distilled off after the reaction, preferably under reduced pressure.

A preferred primary amine of general formula (I) is N-phenyl-1,4-phenylenediamine.

The inventive polymers are preferably used to improve lubricant oil properties. The lubricant oils include especially mineral base oils, synthetic base oils and natural base oils.

The present invention also relates to the use of the above-described polyalkyl(meth)acrylate based comb polymers for reducing the friction coefficient of lubricating oil compositions, especially of engine oil compositions.

The present invention further relates to a method of reducing the friction coefficient of lubricating oil compositions, especially of engine oil compositions, by applying the above-described polyalkyl(meth)acrylate based comb polymers.

A second object of the present invention is directed to an additive composition, comprising:
- (A) a first base oil selected from the group consisting of API Group III oils and mixtures thereof;
- (B) a second base oil selected from the group consisting of API Group V base oils and mixtures thereof, preferably ester oils and mixtures thereof; and
- (C) a polyalkyl(meth)acrylate based comb polymer consisting of a base polymer A and units B which are grafted thereon, wherein the base polymer A comprises:
  - (a) 10 to 25% by weight of repeat units derived from esters of (meth)acrylic acid and a hydroxylated hydrogenated polybutadiene;
  - (b) 0% to 2% by weight of repeat units derived from methyl (meth)acrylate;
  - (c) 60% to 80% by weight of repeat units derived from butyl (meth)acrylate, preferably n-butyl methacrylate;
  - (d) 0% to 15% by weight of repeat units derived from $C_{10-20}$-alkyl (meth)acrylates, preferably $C_{12-14}$-alkyl methacrylate; and
  - (e) 0% to 2% by weight of repeat units derived from styrene monomers having 8 to 17 carbon atoms, preferably styrene,
  - the amount of each component (a) to (e) being based on the total composition of the polyalkyl(meth)acrylate based comb polymer; and
  - the grafted units B comprise repeating units prepared from:
  - (f) 1% to 2.5% by weight of repeat units derived from polar unsaturated monomers selected from the group consisting of maleic acid, maleic acid anhydride, methyl maleic acid anhydride, maleic acid monoester and maleic acid diester; and
  - (g) 2% to 5% by weight of repeat units derived from primary amines of general formula (I)

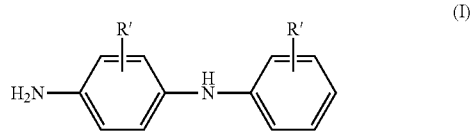

wherein each R' may independently be selected from the group consisting of H and an alkyl radical having 1 to 9 carbon atoms,
  the amount of each component (f) and (g) being based on the total composition of the polyalkyl(meth) acrylate based comb polymer.

A preferred second embodiment of the present invention is directed to an additive composition comprising:
- (A) a first base oil selected from the group consisting of API Group III oils and mixtures thereof;
- (B) a second base oil selected from the group consisting of API Group V base oils and mixtures thereof, preferably ester oils and mixtures thereof; and
- (C) a polyalkyl(meth)acrylate based copolymer consisting of a base polymer A and units B which are grafted thereon, wherein the base polymer A comprises:
  - (a) 10 to 15% by weight of repeat units derived from esters of (meth)acrylic acid and a hydroxylated hydrogenated polybutadiene;
  - (b) 0% to 2% by weight of repeat units derived from methyl (meth)acrylate;
  - (c) 65% to 76% by weight of repeat units derived from butyl (meth)acrylate, preferably n-butyl methacrylate;
  - (d) 5% to 16% by weight of repeat units derived from $C_{10-20}$-alkyl (meth)acrylates, preferably $C_{12-14}$-alkyl methacrylate; and
  - (e) 0% to 2% by weight of repeat units derived from styrene monomers having 8 to 17 carbon atoms, preferably styrene,
  - the amount of each component (a) to (e) being based on the total composition of the polyalkyl(meth)acrylate based comb polymer; and
  - the grafted units B comprise repeating units prepared from:
  - (f) 1% to 2.5% by weight of repeat units derived from polar unsaturated monomers selected from the group consisting of maleic acid, maleic acid anhydride, methyl maleic acid anhydride, maleic acid monoester and maleic acid diester; and
  - (g) 2% to 5% by weight of repeat units derived from primary amines of general formula (I)

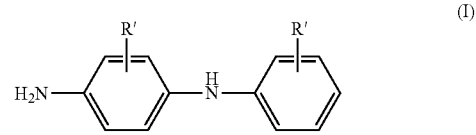

wherein each R' may independently be selected from the group consisting of H and an alkyl radical having 1 to 9 carbon atoms,
  the amount of each component (f) and (g) being based on the total composition of the polyalkyl(meth) acrylate based comb polymer.

The content of each component (a), (b), (c), (d), (e) and (f) is based on the total composition of the polyalkyl(meth) acrylate based comb polymer.

The additive compositions according to the present invention are further characterized by a high viscosity index (VI). The VI is at least 150, preferably in the range of 150 to 300, more preferably in the range of 170 to 270.

The base oil to be used in the additive composition comprises an oil of lubricating viscosity. Such oils include natural and synthetic oils, oil derived from hydrocracking, hydrogenation, and hydro-finishing, unrefined, refined, re-refined oils or mixtures thereof.

The base oil may also be defined as specified by the American Petroleum Institute (API) (see April 2008 version of "Appendix E-API Base Oil Interchangeability Guidelines for Passenger Car Motor Oils and Diesel Engine Oils", section 1.3 Sub-heading 1.3. "Base Stock Categories").

The API currently defines five groups of lubricant base stocks (API 1509, Annex E—API Base Oil Interchangeability Guidelines for Passenger Car Motor Oils and Diesel Engine Oils, September 2011). Groups I, II and III are mineral oils which are classified by the amount of saturates and sulphur they contain and by their viscosity indices;

Group IV are polyalphaolefins; and Group V are all others, including e.g. ester oils. Ester oils which can be used in accordance with the present invention are preferably selected from the group consisting of Plastomoll DNA, DIOS and mixtures thereof. The table below illustrates these API classifications.

| Group | Saturates | Sulphur content | Viscosity Index (VI) |
|---|---|---|---|
| I | <90% | >0.03% | 80-120 |
| II | at least 90% | not more than 0.03% | 80-120 |
| III | at least 90% | not more than 0.03% | at least 120 |
| IV | All polyalphaolefins (PAOs) | | |
| V | All others not included in Groups I, II, III or IV (e.g. ester oils) | | |

The kinematic viscosity at 100° C. ($KV_{100}$) of appropriate apolar base oils used to prepare an additive composition or lubricating composition in accordance with the present invention is preferably in the range of 3 $mm^2/s$ to 10 $mm^2/s$, more preferably in the range of 4 $mm^2/s$ to 8 $mm^2/s$, according to ASTM D445.

Further base oils which can be used in accordance with the present invention are Group II-III Fischer-Tropsch derived base oils.

Fischer-Tropsch derived base oils are known in the art. By the term "Fischer-Tropsch derived" is meant that a base oil is, or is derived from, a synthesis product of a Fischer-Tropsch process. A Fischer-Tropsch derived base oil may also be referred to as a GTL (Gas-To-Liquids) base oil. Suitable Fischer-Tropsch derived base oils that may be conveniently used as the base oil in the lubricating composition of the present invention are those as for example disclosed in EP 0 776 959, EP 0 668 342, WO 97/21788, WO 00/15736, WO 00/14188, WO 00/14187, WO 00/14183, WO 00/14179, WO 00/08115, WO 99/41332, EP 1 029 029, WO 01/18156, WO 01/57166 and WO 2013/189951.

Especially for engine oil formulations are used base oils of API Group III or mixtures thereof.

A preferred additive composition of the present invention comprises:

(A) 0 to 40% by weight of a base oil selected from the group consisting of API Group III oils and mixtures thereof;

(B) 20 to 80% by weight of a base oil selected from the group consisting of API Group V base oils and mixtures thereof, preferably ester oils and more preferred Plastomoll DNA, DIOS or mixtures thereof; and (C) 20 to 40% by weight of a polyalkyl(meth)acrylate based comb polymer according to the first embodiment of the present invention as disclosed further above, based on the total weight of the additive composition.

A preferred additive composition of the present invention comprises:

(A) 0 to 40% by weight of a base oil selected from the group consisting of API Group III base oils and mixtures thereof;

(B) 20 to 80% by weight of a base oil selected from the group consisting of API Group V base oils and mixtures thereof, preferably ester oils and more preferred Plastomoll DNA, DIOS or mixtures thereof; and (C) 20 to 40% by weight of a polyalkyl(meth)acrylate based comb polymer according to the preferred first embodiment of the present invention as disclosed further above, based on the total weight of the additive composition.

A further preferred additive composition of the present invention comprises:

(A) 0 to 37.5% by weight of a base oil selected from the group consisting of API Group III base oils and mixtures thereof;

(B) 22.5 to 75% by weight of a base oil selected from the group consisting of API Group V base oils and mixtures thereof, preferably ester oils and more preferred Plastomoll DNA, DIOS or mixtures thereof; and (C) 25 to 40% by weight of a polyalkyl(meth)acrylate based comb polymer according to the first embodiment of the present invention as disclosed further above, based on the total weight of the additive composition.

A further preferred additive composition of the present invention comprises:

(A) 0 to 37.5% by weight of a base oil selected from the group consisting of API Group V base oils and mixtures thereof;

(B) 22.5 to 75% by weight of a base oil selected from the group consisting of API Group V base oils and mixtures thereof, preferably ester oils and more preferred Plastomoll DNA, DIOS or mixtures thereof; and (C) 25 to 40% by weight of a polyalkyl(meth)acrylate based comb polymer according to the preferred first embodiment of the present invention as disclosed further above, based on the total weight of the additive composition.

The content of each component (A), (B) and (C) is based on the total weight of the additive composition.

In a particular embodiment, the proportions of components (A), (B) and (C) add up to 100% by weight.

The present invention also relates to the use of the above-described additive composition for reducing the friction coefficient of lubricating oil compositions, especially of engine oil compositions. The present invention further relates to a method of reducing the friction coefficient of lubricating oil compositions, especially of engine oil compositions, by applying the above-described additive composition.

A third object of the present invention is directed to a lubricating oil composition, comprising:

(A) 60 to 99% by weight of a base oil selected from the group consisting of API Group I, API Group II, API Group III, API Group IV oils and mixtures thereof;

(B) 0.25 to 15% by weight of a base oil selected from the group consisting of API Group V base oils and mixtures thereof, preferably ester oils and more preferred Plastomoll DNA or DIOS;

(C) 0.5 to 10% by weight of a polyalkyl(meth)acrylate based copolymer consisting of a base polymer A and units B which are grafted thereon, wherein the base polymer A comprises:

(a) 10 to 25% by weight of repeating units derived from esters of (meth)acrylic acid and a hydroxylated hydrogenated polybutadiene;

(b) 0% to 2% by weight of repeating units derived from methyl (meth)acrylate;

(c) 60% to 80% by weight of repeating units derived from butyl (meth)acrylate, preferably n-butyl methacrylate;

(d) 0% to 15% by weight of repeating units derived from $C_{10-20}$-alkyl (meth)acrylates, preferably $C_{12-14}$-alkyl methacrylate; and (e) 0% to 2% by weight of repeating units derived from styrene monomers having 8 to 17 carbon atoms, preferably styrene, the amount of each component (a) to (e) being based on the total composition of the polyalkyl(meth)acrylate based comb polymer; and the grafted units B comprise repeating units prepared from:

(f) 1% to 2.5% by weight of repeating units derived from polar unsaturated monomers selected from the group consisting of maleic acid, maleic acid anhydride, methyl maleic acid anhydride, maleic acid monoester and maleic acid diester; and (g) 2% to 5% by weight of repeating units derived from primary amines of general formula (I)

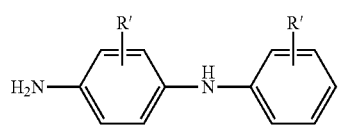

wherein each R' may independently be selected from the group consisting of H and an alkyl radical having 1 to 9 carbon atoms, the amount of each component (f) and (g) being based on the total composition of the polyalkyl(meth) acrylate based comb polymer; and (D) 0 to 15% by weight of one or more further additives.

A preferred third object of the present invention is directed to a lubricating oil composition, comprising:

(A) 60 to 99% by weight of a base oil selected from the group consisting of API Group I, API Group II, API Group III, API Group IV oils and mixtures thereof;

(B) 0.25 to 15% by weight of a base oil selected from the group consisting of API Group V base oils and mixtures thereof, preferably ester oils and more preferred Plastomoll DNA or DIOS; and (C) 0.5 to 10% by weight of a polyalkyl(meth)acrylate based copolymer consisting of a base polymer A and units B which are grafted thereon, wherein the base polymer A comprises:

(a) 10 to 15% by weight of repeating units derived from esters of (meth)acrylic acid and a hydroxylated hydrogenated polybutadiene;

(b) 0% to 2% by weight of repeating units derived from methyl (meth)acrylate;

(c) 65% to 76% by weight of repeating units derived from butyl (meth)acrylate, preferably n-butyl methacrylate;

(d) 5% to 16% by weight of repeating units derived from $C_{10-20}$-alkyl (meth)acrylates, preferably $C_{12-14}$-alkyl methacrylate; and (e) 0% to 2% by weight of repeating units derived from styrene monomers having 8 to 17 carbon atoms, preferably styrene, the amount of each component (a) to (e) being based on the total composition of the polyalkyl(meth)acrylate based comb polymer; and the grafted units B comprise repeating units prepared from:

(f) 1% to 2.5% by weight of repeating units derived from polar unsaturated monomers selected from the group consisting of maleic acid, maleic acid anhydride, methyl maleic acid anhydride, maleic acid monoester and maleic acid diester; and (g) 2% to 5% by weight of repeating units derived from primary amines of general formula (I)

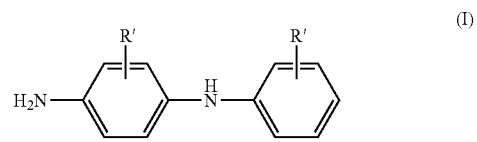

wherein each R' may independently be selected from the group consisting of H and an alkyl radical having 1 to 9 carbon atoms, the amount of each component (f) and (g) being based on the total composition of the polyalkyl(meth) acrylate based comb polymer; and (D) 0 to 15% by weight of one or more further additives.

A further preferred third object of the present invention is directed to a lubricating oil composition, comprising:

(A) 65 to 98% by weight of a base oil selected from the group consisting of API Group I, API Group II, API Group III, API Group IV oils and mixtures thereof;

(B) 0.25 to 10% by weight of a base oil selected from the group consisting of API Group V base oils and mixtures thereof, preferably ester oils and more preferred Plastomoll DNA or DIOS; and (C) 1 to 8% by weight of a polyalkyl(meth)acrylate based copolymer as disclosed under the first embodiment mentioned further above; and D) 0 to 15% by weight of one or more further additives.

A further preferred third object of the present invention is directed to a lubricating oil composition, comprising:

(A) 65 to 98% by weight of a base oil selected from the group consisting of API Group I, API Group II, API Group III, API Group IV oils and mixtures thereof;

(B) 0.25 to 10% by weight of a base oil selected from the group consisting of API Group V base oils and mixtures thereof, preferably ester oils and more preferred Plastomoll DNA or DIOS; and (C) 1 to 8% by weight of a polyalkyl(meth)acrylate based copolymer as disclosed under the preferred first embodiment mentioned further above; and (D) 0 to 15% by weight of one or more further additives.

A further preferred third object of the present invention is directed to a lubricating oil composition, comprising:

(A) 68 to 95% by weight of a base oil selected from the group consisting of API Group I, API Group II, API Group III, API Group IV oils and mixtures thereof;

(B) 3 to 10% by weight of a base oil selected from the group consisting of API Group V base oils and mixtures thereof, preferably ester oils and more preferred Plastomoll DNA or DIOS; and (C) 2 to 7% by weight of a polyalkyl(meth)acrylate based copolymer as disclosed under the first embodiment mentioned further above; and (D) 0 to 15% by weight of one or more further additives.

A further preferred third object of the present invention is directed to a lubricating oil composition, comprising:

(A) 68 to 95% by weight of a base oil selected from the group consisting of API Group I, API Group II, API Group III, API Group IV oils and mixtures thereof;

(B) 3 to 10% by weight of a base oil selected from the group consisting of API Group V base oils and mixtures thereof, preferably ester oils and more preferred Plastomoll DNA or DIOS; and (C) 2 to 7% by weight of a polyalkyl(meth)acrylate based copolymer as disclosed under the preferred first embodiment mentioned further above; and (D) 0 to 15% by weight of one or more further additives.

The content of each component (a), (b), (c), (d), (e), (f) and (g) is based on the total composition of the polyalkyl (meth)acrylate based comb polymer.

The content of each component (A), (B), (C) and (D) is based on the total composition of the lubricating oil composition.

The lubricating oil compositions according to the present invention are characterized by a coefficient of friction below 40, preferably in the range of 30 to 39 @5-2000 mm/s (when formulated to $HTHS_{150}$=2.6 mPas).

The lubricating oil compositions according to the present invention are further characterized by a $KV_{40}$ in the range of 22 to 25 mm$^2$/s (when formulated to $HTHS_{150}$=2.6 mPas).

The lubricating oil compositions according to the present invention are further characterized by $HTHS_{100}$ in the range of 4.0 to 5 mPas (when formulated to $HTHS_{150}$=2.6 mPas).

Preferred lubricating oil compositions according to the present invention are characterized by a coefficient of friction in the range of 30 to 39 @5-2000 mm/s and a $KV_{40}$ in the range of 22 to 25 mm$^2$/s (when formulated to $HTHS_{150}$=2.6 mPas).

Even more preferred lubricating oil compositions according to the present invention are characterized by a coefficient of friction in the range of 30 to 39 @5-2000 mm/s, a $KV_{40}$ in the range of 22 to 25 mm$^2$/s and $HTHS_{100}$ values in the range of 4.0 to 5 mPas (when formulated to $HTHS_{150}$=2.6 mPas).

Further preferred contents of components (A), (B), (C) and (D) in the lubricating oil compositions according to the present invention are as detailed in the following table:

|  | (1) | (2) | (3) | (4) | (5) | (6) |
|---|---|---|---|---|---|---|
| Component (A) [%] | 65 to 96 | 65 to 96 | 70 to 95 | 70 to 95 | 73 to 92 | 73 to 92 |
| Component (B) [%] | 0.25 to 15 | 0.25 to 15 | 0.25 to 10 | 0.25 to 10 | 3 to 10 | 3 to 10 |
| Component (C) according to first embodiment disclosed further above [%] | 0.5 to 10 | — | 1 to 8 | — | 2 to 7 | — |
| Component (C) according to preferred first embodiment disclosed further above [%] | — | 0.5 to 10 | — | 1 to 8 | — | 2 to 7 |
| Component (D) [%] | 3 to 10 | 3 to 10 | 3 to 10 | 3 to 10 | 3 to 10 | 3 to 10 |

In a particular embodiment, the proportions of components (A), (B), (C) and (D) add up to 100% by weight.

The lubricating oil composition according to the invention may also contain, as component (D), further additives selected from the group consisting of VI improvers, dispersants, defoamers, detergents, antioxidants, pour point depressants, antiwear additives, extreme pressure additives, friction modifiers, anticorrosion additives, dyes and mixtures thereof.

Conventional VI improvers include especially polyalkyl (meth)acrylates having 1 to 30 carbon atoms in the alcohol group (PAMAs; partly N/O-functionalized with advantageous additional properties as dispersants, antiwear additives and/or friction modifiers), and poly(iso)butenes (PIB), fumarate-olefin copolymers, styrene-maleate copolymers, hydrogenated styrene-diene copolymers (HSDs, U.S. Pat. Nos. 4,116,917, 3,772,196 and 4,788,316) and olefin copolymers (OCPs, K. Marsden: "Literature Review of OCP Viscosity Modifiers", Lubrication Science 1 (1988), 265), especially of the poly(ethylene-co-propylene) type, which may often also be present in N/O-functionalized form with dispersing action.

Compilations of VI improvers and pour point improvers for lubricant oils, especially motor oils, are detailed, for example, in T. Mang, W. Dresel (eds.): "Lubricants and Lubrication", Wiley-VCH, Weinheim 2001: R. M. Mortier, S. T. Orszulik (eds.): "Chemistry and Technology of Lubricants", Blackie Academic & Professional, London 1992; or J. Bartz: "Additive für Schmierstoffe", Expert-Verlag, Renningen-Malmsheim 1994.

Appropriate dispersants include poly(isobutylene) derivatives, for example poly(isobutylene)succinimides (PIBSIs), including borated PIBSIs; and ethylene-propylene oligomers having N/O functionalities.

Dispersants (including borated dispersants) are preferably used in an amount of 0 to 5% by weight, based on the total amount of the lubricating oil composition.

Suitable defoamers are silicone oils, fluorosilicone oils, fluoroalkyl ethers, etc.

The defoaming agent is preferably used in an amount of 0.005 to 0.1% by weight, based on the total amount of the lubricating oil composition.

The preferred detergents include metal-containing compounds, for example phenoxides; salicylates; thiophosphonates, especially thiopyrophosphonates, thiophosphonates and phosphonates; sulfonates and carbonates. As metal, these compounds may contain especially calcium, magnesium and barium. These compounds may preferably be used in neutral or overbased form.

Detergents are preferably used in an amount of 0.2 to 1% by weight, based on the total amount of the lubricating oil composition.

The suitable antioxidants include, for example, phenol-based antioxidants and amine-based antioxidants.

Phenol-based antioxidants include, for example, octadecyl-3-(3,5-di-tert-butyl-4-hydroxyphenyl)propionate; 4,4'-methylenebis(2,6-di-tert-butylphenol); 4,4'-bis(2,6-di-t-butylphenol); 4,4'-bis(2-methyl-6-t-butylphenol); 2,2'-methylenebis(4-ethyl-6-t-butylphenol); 2,2'-methylenebis(4-methyl-6-t-butyl phenol); 4,4'-butylidenebis(3-methyl-6-t- butylphenol); 4,4'-isopropylidenebis(2,6-di-t-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-t-butyl-4-methylphenol; 2,6-di-t-butyl-4-ethyl-phenol; 2,4-dimethyl-6-t-butylphenol; 2,6-di-t-amyl-p-cresol; 2,6-di-t-butyl-4-(N,N'-dimethylaminomethylphenol); 4,4'thiobis(2-methyl-6-t-butylphenol); 4,4'-thiobis(3-methyl-6-t-butylphenol); 2,2'-thiobis(4-methyl-6-t-butylphenol); bis(3-methyl-4-hydroxy-5-t-butylbenzyl) sulfide; bis(3,5-di-t-butyl-4-hydroxybenzyl) sulfide; n-octyl-3-(4-hydroxy-3,5-di-t-butylphenyl)propionate; n-octadecyl-3-(4-hydroxy-3,5-di-t-butylphenyl)propionate; 2,2'-thio[diethyl-bis-3-(3,5-di-t-butyl-4-hydroxyphenyl)propionate], etc. Of those, especially preferred are bis-phenol-based antioxidants and ester group containing phenol-based antioxidants.

The amine-based antioxidants include, for example, monoalkyldiphenylamines such as monooctyldiphenylamine, monononyldiphenylamine, etc.; dialkyldiphenylamines such as 4,4'-dibutyldiphenylamine, 4,4'-dipentyldiphenylamine, 4,4'-dihexyldiphenylamine, 4,4'-diheptyldiphenylamine, 4,4'-dioctyldiphenylamine, 4,4'-dinonyldiphenylamine, etc.; polyalkyldiphenylamines such as tetrabutyldiphenylamine, tetrahexyldiphenylamine, tetraoctyldiphenylamine, tetranonyldiphenylamine, etc.; naphthylamines, concretely alpha-naphthylamine, phenyl-alpha-naphthylamine and further alkyl-substituted phenyl-alpha-naphthylamines such as butylphenyl-alpha-naphthylamine, pentylphenyl-alpha-naphthylamine, hexylphenyl-alpha-naphthylamine, heptylphenyl-alpha-naphthylamine, octylphenyl-alpha-naphthylamine, nonylphenyl-alpha-naphthylamine, etc. Of those, diphenylamines are preferred to naphthylamines, from the viewpoint of the antioxidation effect thereof.

Suitable antioxidants may further be selected from the group consisting of compounds containing sulfur and phosphorus, for example metal dithiophosphates, for example zinc dithiophosphates (ZnDTPs), "OOS triesters"=reaction products of dithiophosphoric acid with activated double bonds from olefins, cyclopentadiene, norbornadiene, α-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc bis(dialkyldithiocarbamate) and methylene bis(dialkyldithiocarbamate); organophosphorus compounds, for example triaryl and trialkyl phosphites; organocopper compounds and overbased calcium- and magnesium-based phenoxides and salicylates.

Antioxidants are used in an amount of 0 to 15% by weight, preferably 0.1 to 10% by weight, more preferably 0.5 to 5% by weight, based on the total amount of the lubricating oil composition.

The pour-point depressants include ethylene-vinyl acetate copolymers, chlorinated paraffin-naphthalene condensates, chlorinated paraffin-phenol condensates, polymethacrylates, polyalkylstyrenes, etc. Preferred are polymethacrylates having a mass-average molecular weight of from 5.000 to 50.000 g/mol.

The amount of the pour point depressant is preferably from 0.1 to 5% by weight, based on the total amount of the lubricating oil composition.

The preferred antiwear and extreme pressure additives include sulfur-containing compounds such as zinc dithiophosphate, zinc di-$C_{3-12}$-alkyldithiophosphates (ZnDTPs), zinc phosphate, zinc dithiocarbamate, molybdenum dithiocarbamate, molybdenum dithiophosphate, disulfides, sulfurized olefins, sulfurized oils and fats, sulfurized esters, thiocarbonates, thiocarbamates, polysulfides, etc.; phosphorus-containing compounds such as phosphites, phosphates, for example trialkyl phosphates, triaryl phosphates, e.g. tricresyl phosphate, amine-neutralized mono- and dialkyl phosphates, ethoxylated mono- and dialkyl phosphates, phosphonates, phosphines, amine salts or metal salts of those compounds, etc.; sulfur and phosphorus-containing anti-wear agents such as thiophosphites, thiophosphates, thiophosphonates, amine salts or metal salts of those compounds, etc.

The antiwear agent may be present in an amount of 0 to 3% by weight, preferably 0.1 to 1.5% by weight, more preferably 0.5 to 0.9% by weight, based on the total amount of the lubricating oil composition.

Friction modifiers used may include mechanically active compounds, for example molybdenum disulfide, graphite (including fluorinated graphite), poly(trifluoroethylene), polyamide, polyimide; compounds that form adsorption layers, for example long-chain carboxylic acids, fatty acid esters, ethers, alcohols, amines, amides, imides; compounds which form layers through tribochemical reactions, for example saturated fatty acids, phosphoric acid and thiophosphoric esters, xanthogenates, sulfurized fatty acids; compounds that form polymer-like layers, for example ethoxylated dicarboxylic partial esters, dialkyl phthalates, methacrylates, unsaturated fatty acids, sulfurized olefins or organometallic compounds, for example molybdenum compounds (molybdenum dithiophosphates and molybdenum dithiocarbamates MoDTCs) and combinations thereof with ZnDTPs, copper-containing organic compounds.

Friction modifiers may be used in an amount of 0 to 6% by weight, preferably 0.05 to 4% by weight, more preferably 0.1 to 2% by weight, based on the total amount of the lubricating oil composition.

Some of the compounds listed above may fulfil multiple functions. ZnDTP, for example, is primarily an antiwear additive and extreme pressure additive, but also has the character of an antioxidant and corrosion inhibitor (here: metal passivator/deactivator).

The above-detailed additives are described in detail, inter alia, in T. Mang, W. Dresel (eds.): "Lubricants and Lubrication", Wiley-VCH, Weinheim 2001; R. M. Mortier, S. T. Orszulik (eds.): "Chemistry and Technology of Lubricants".

Preferably, the total concentration of the one or more additives (D) is 0.05% to 15% by weight, more preferably 3% to 10% by weight, based on the total weight of the lubricating oil composition.

FIG. 1: MTM test results (50% SRR, 30N, 100° C., 136 min)

The invention has been illustrated by the following non-limiting examples.

EXPERIMENTAL PART

Abbreviations

AMA alkyl methacrylate
$C_1$ AMA $C_1$-alkyl methacrylate=methyl methacrylate (MMA)
$C_4$ AMA $C_4$-alkyl methacrylate=n-butyl methacrylate
$C_{14/16/18}$ AMA typically 5% C14, 30% C16, 65% C18, all linear D dispersity
DIOS Dioctylsebacate (CAS: 122-62-3), Group V base oil from Sterinerie Debois with a $KV_{100}$ of 3.2 cSt
DMAEMA 2-(Dimethylamino)ethyl methacrylate
FE fuel economy
FM friction modifier
Gr III Oil Group III base oil mixture (NB 3043 and NB 3080 from Neste) with a $KV_{100}$ of 4.9 cSt
$HTHS_{80}$ high-temperature high-shear viscosity @80° C., measured according to CEC L-036
$HTHS_{100}$ high-temperature high-shear viscosity @100° C., measured according to CEC L-036
$HTHS_{150}$ high-temperature high-shear viscosity @150° C., measured according to CEC L-036
KV kinematic viscosity measured according to ASTM D445
$KV_{40}$ kinematic viscosity @40° C., measured according to ISO 3104
$KV_{60}$ kinematic viscosity @60° C., measured according to ISO 3104
$KV_{100}$ kinematic viscosity @100° C., measured according to ISO 3104
LMA lauryl methacrylate, 73% C12, 27% C14, all linear
MA maleic anhydride
MM macromonomer
MMA methyl methacrylate
$M_n$ number-average molecular weight
$M_w$ weight-average molecular weight
MTM mini traction machine
NB 3020 Nexbase® 3020, Group III base oil from Neste with a $KV_{100}$ of 2.2 cSt
NB 3043 Nexbase® 3043, Group III base oil from Neste with a $KV_{100}$ of 4.3 cSt
PDA N-phenyl-1,4-phenylenediamine
OLOA® 55501 DI Package for PCMO commercially available from Oronite
PCMO passenger car motor oils
PDI polydispersity index
Plastomoll DNAdiisononyl adipate, Group V base oil from BASF
Sty styrene
VI viscosity index, measured according to ISO 2909
Yubase 4 Group III base oil from SK Lubricants with a $KV_{100}$ of 4.2 cSt
Test Methods The comb polymers according to the present invention and the comparative examples were characterized with respect to their molecular weight and PDI.

Molecular weights were determined by size exclusion chromatography (SEC) using commercially available polymethylmethacrylate (PMMA) standards. The determination is effected by gel permeation chromatography with THF as eluent (flow rate: 1 mL/min; injected volume: 100 μl).

The additive compositions including the comb polymers according to the present invention and comparative examples were characterized with respect to their viscosity index (VI) to ASTM D 2270, kinematic viscosity at 40° C. ($KV_{40}$) and 100° C. ($KV_{100}$) to ASTM D445 and with respect to their shear stability.

To show the shear stability of the additive compositions, the PSSI (Permanent Shear Stability Index) was calculated according to ASTM D 6022-01 (Standard Practice for Calculation of Permanent Shear Stability Index) based on data measured according to ASTM D 2603-B (Standard Test Method for Sonic Shear Stability of Polymer-Containing Oils).

The lubricating oil compositions including the comb polymers according to the present invention and comparative examples were characterized with respect to kinematic viscosity at 40° C. ($KV_{40}$), at 60° C. ($KV_{60}$) and 100° C. ($KV_{100}$) to ASTM D445, the viscosity index (VI) to ASTM D 2270, high-temperature high-shear viscosity at 80° C. ($HTHS_{80}$), 100° C. ($HTHS_{100}$) and 150° C. ($HTHS_{150}$) to CEC L-036, Noack evaporation loss at 250° C. for 1 hour to CEC L-40B and CCS (Cold-Cranking Simulator) apparent viscosity at −35° C. to ASTM D 5293.

Determination of Friction Reduction

The measurement of the coefficient of friction at 100° C. was performed as described in WO 2004/087850. The experiments were carried out on a mini traction machine (MTM, PCS Instruments) under the following conditions:

TABLE

Test parameters and conditions for the MTM frictional tests.

| Test rig | PCS MTM 3 |
|---|---|
| Disk | Steel, AISI 52100, diameter = 40.0 mm<br>RMS = 25 to 30 nm, Rockwell C hardness = 63<br>Elastic modulus = 207 GPa |
| Ball | Steel, AISI 52100, diameter = 19.0 mm<br>RMS = 10 to 13 nm, Rockwell C hardness = 58-65<br>Elastic modulus = 207 GPa |
| Speed | 0.005 m/s to 2.5 m/s |
| Temperature | 120° C. |
| Sliding/rolling ratio (SRR) | 50% |
| Load | 30 N = 0.93 GPa max. Hertzian pressure |

As a result of a frictional experiment, a Stribeck curve was obtained (coefficient of friction as a function of the rolling/sliding speed).

The evaluation of the friction value measurements is shown in the graph in FIG. 1. The area under the curve corresponds to the "total friction" over the entire speed range examined and is a quantifiable result in which the friction can be expressed as a number. The smaller the area, the greater the friction-reducing effect of the polymer examined.

The areas are determined by integration of the friction value curves in the range of sliding speed 0.005 to 2.0 m/s and 0.0005 to 0.2 m/s and compared to the non-functionalized polymers.

Engine Testing

The fuel economy testing was conducted by using as engine an Insignia 2.0 L General Motors L850 gasoline turbo direct injection, where the engine was set up on a test bench.

The FTP-75 fuel economy cycle was used as a standard fuel economy test in passenger cars to evaluate the fuel economy performance. The EPA Federal Test Procedure, commonly known as FTP-75, for the city driving cycle is a series of tests defined by the US Environmental Protection Agency (EPA) to measure tailpipe emission and fuel economy for passenger cars. The test was repeated 3 times and an average of the three runs was calculated.

As reference was used a SAE 0W16 grade formulation with VPL 3-200 (commercially available from Evonik Industries) as VI improver. The reference was run at the beginning and after every two test formulations.

Synthesis of a Hydroxylated Hydrogenated Polybutadiene

The macroalcohol prepared was a hydroxypropyl-terminated hydrogenated polybutadiene having a mean molar mass $M_n$=4750 g/mol.

The macroalcohol was synthesized by an anionic polymerization of 1,3-butadiene with butyllithium at 20-45° C. On attainment of the desired degree of polymerization, the reaction was stopped by adding propylene oxide and lithium was removed by precipitation with methanol. Subsequently, the polymer was hydrogenated under a hydrogen atmosphere in the presence of a noble metal catalyst at up to 140° C. and pressure 200 bar. After the hydrogenation had ended, the noble metal catalyst was removed and organic solvent was drawn off under reduced pressure. Finally, the base oil NB 3020 was used for dilution to a polymer content of 70% by weight.

The vinyl content of the macroalcohol was 61%, the hydrogenation level >99% and the OH functionality >98%. These values were determined by $^1$H-NMR (nuclear resonance spectroscopy).

Synthesis of Macromonomer (MM)

In a 2 L stirred apparatus equipped with saber stirrer, air inlet tube, thermocouple with controller, heating mantle, column having a random packing of 3 mm wire spirals, vapor divider, top thermometer, reflux condenser and substrate cooler, 1000 g of the above-described macroalcohol are dissolved in 450 g of methyl methacrylate (MMA) by stirring at 60° C. Added to the solution are 20 ppm of 2,2,6,6-tetramethylpiperidin-1-oxyl radical and 200 ppm of hydroquinone monomethyl ether. After heating to MMA reflux (bottom temperature about 110° C.) while passing air through for stabilization, about 20 g of MMA are distilled off for azeotropic drying. After cooling to 95° C., 0.30 g of LiOCH$_3$ is added and the mixture is heated back to reflux. After the reaction time of about 1 hour, the top temperature has fallen to ~64° C. because of methanol formation. The methanol/MMA azeotrope formed is distilled off constantly until a constant top temperature of about 100° C. is established again. At this temperature, the mixture is left to react for a further hour. For further workup, the bulk of MMA is drawn off under reduced pressure. Insoluble catalyst residues are removed by pressure filtration (Seitz T1000 depth filter). The content of NB 3020 "entrained" into the copolymer syntheses described further down was taken into account accordingly.

Synthesis of Working Examples (1) Base Polymer Synthesis

An apparatus with 4-neck flask and precision glass saber stirrer is initially charged with a 300 g mixture of low molecular weight monomers and macromonomer (compositional details are shown in Table 1), and with 200 g of a base oil mixture of Plastomoll DNA/NB3020=92.3:7.7. After heating to 115° C. under nitrogen, 1.8 g of 2,2-bis(tert-butylperoxy)butane (50% in mineral oil) is added and the temperature is maintained. Another 500 g of the monomer-oil mixture and 1.8 g 2,2-bis(tert-butylperoxy)butane (50% in mineral oil) is added within 3 hours. Then the reaction is maintained at 115° C. for another 2 h. Subsequently, the reaction mixture is diluted to 40% solids with Plastomoll DNA and 0.2% 2,2-bis(tert-butylperoxy)butane within 3 hours. Then the reaction is maintained at 115° C. for another 2 h and after this another 0.2% 2,2-bis(tert-butylperoxy)butane is added and the mixture is stirred at 115° C. overnight. 1500 g of a 40% solution of comb polymer in mineral oil are obtained. The monomer components will add up to 100%. The amounts of initiator and dilution oil are given relative to the total amount of monomers.

(2) Grafting Step

Maleic anhydride is heated up at 90° C. An apparatus with a 4-neck flask and precision glass saber stirrer is charged with 1400 g of the base polymer mixture as prepared in step (1) and heated up to 110° C. under nitrogen. Then 7 g of molten maleic anhydride are added. 1.4 g of tert-butyl perbenzoate is added. Subsequently, the reaction temperature is increased to 130° C. After 1 h, 2 h and 3 h another 0.71 g tert-butyl perbenzoate are each added to the reaction mixture. The grafting reaction is finished 2 hours after the last initiator addition.

(3) Amine Reaction Step

A solution of 15% by weight of PDA in Plastomoll DNA is prepared at 90° C. Then an apparatus with a 4-neck flask and precision glass saber stirrer and condenser is charged with 503 g of the grafted polymer mixture prepared as described under step (2). After heating to 120° C. under nitrogen 31.5 g PDA solution (15% in Plastomoll DNA) is added within 4 hours. During the reaction water is formed and distilled off the reaction mixture. The post-grafting reaction is finished 2 hours after PDA addition.

Description of the Examples

Table 1 summarizes the monomer components of the examples and comparative examples as used in the synthesis of the polymers.

The following variations of the above described procedure were made:

Ex 4: double of the amount of maleic anhydride and PDA were used in steps (2) and (3)

Ex 5 and Ex 6: Plastomoll DNA was replaced by DIOS in all reaction steps

CE-1 and CE-2: no grafting and amine reaction step

CE-3: no grafting and amine reaction step; instead the functional monomer DMAEMA was added with the other monomers in step (1)

CE-5: 2.3 times the amount of maleic anhydride and PDA were used in steps (2) and (3)

TABLE 1

Monomer mixtures (40% of reaction mixture) used to prepare working examples and comparative examples (CE).

| Polymer Example # | MM [wt %] | LMA [wt %] | C4 AMA [wt %] | Sty [wt %] | C1 AMA [wt %] | MA [wt %] | PDA [wt %] |
|---|---|---|---|---|---|---|---|
| 1 | 11.58 | 8.39 | 74.87 | 1.40 | 0.24 | 1.22 | 2.30 |
| 2 | 11.58 | 11.28 | 71.98 | 1.40 | 0.24 | 1.22 | 2.30 |
| 3 | 11.58 | 15.14 | 68.12 | 1.40 | 0.24 | 1.22 | 2.30 |
| 4 | 14.33 | 9.16*⁾ | 68.09 | 1.34 | 0.19 | 2.39 | 4.50 |
| 5 | 11.58 | 8.39 | 74.87 | 1.40 | 0.24 | 1.22 | 2.30 |
| 6 | 11.58 | 11.28 | 71.98 | 1.40 | 0.24 | 1.22 | 2.30 |
| CE-1 | 12.0 | 11.7 | 74.6 | 1.45 | 0.25 | — | — |

TABLE 1-continued

Monomer mixtures (40% of reaction mixture) used to prepare working examples and comparative examples (CE).

| Polymer Example # | MM [wt %] | LMA [wt %] | C4 AMA [wt %] | Sty [wt %] | C1 AMA [wt %] | MA [wt %] | PDA [wt %] |
|---|---|---|---|---|---|---|---|
| CE-2 | 15.0 | 5.0 | 68.0 | 12.0 | — | — | — |
| CE-3 | 11.76 | 8.53 | 76.06 | 1.42 | 0.24 | — | 1.99**) |
| CE-4 | 14.47 | 4.82 | 65.61 | 11.58 | — | 1.22 | 2.30 |
| CE-5 | 9.47 | 68.14 | — | — | 14.21 | 2.84 | 5.34 |
| CE-6 | 9.95 | 71.60 | — | — | 14.93 | 1.22 | 2.30 |
| CE-7 | 10.61 | 4.82 | 81.05 | — | — | 1.22 | 2.30 |
| CE-8 | 22.19 | 20.94 | 51.71 | 1.40 | 0.24 | 1.22 | 2.30 |

*) $C_{14/16/18}$ AMA was used instead of LMA
**) DMAEMA was used instead of PDA and randomly copolymerized The net compositions of the resulting comb polymers including the macromonomer conversion rate $MM_{conv.}$ are given in the following Table 2.

TABLE 2

Net Polymer compositions of the resulting comb polymers.

| Polymer Example # | $MM_{conv.}$ [%] | MM [wt %] | LMA [wt %] | C4 AMA [wt %] | Sty [wt %] | C1 AMA [wt %] | MA [wt %] | PDA [wt %] |
|---|---|---|---|---|---|---|---|---|
| 1 | 90 | 10.42 | 8.50 | 75.85 | 1.42 | 0.24 | 1.24 | 2.33 |
| 2 | 88 | 10.19 | 11.46 | 73.11 | 1.42 | 0.24 | 1.24 | 2.34 |
| 3 | 94 | 10.89 | 15.26 | 68.66 | 1.41 | 0.24 | 1.23 | 2.32 |
| 4 | 90 | 12.90 | 9.31*) | 69.23 | 1.36 | 0.19 | 2.43 | 4.58 |
| 5 | 93 | 10.77 | 8.47 | 75.56 | 1.41 | 0.24 | 1.23 | 2.32 |
| 6 | 93 | 10.77 | 11.38 | 72.64 | 1.41 | 0.24 | 1.23 | 2.32 |
| CE-1 | 88 | 10.56 | 11.89 | 75.82 | 1.47 | 0.25 | — | — |
| CE-2 | 88 | 13.20 | 5.11 | 69.44 | 12.25 | — | — | — |
| CE-3 | 88 | 10.35 | 8.67 | 77.28 | 1.44 | 0.24 | — | 2.02**) |
| CE-4 | 88 | 12.73 | 4.92 | 66.94 | 11.82 | — | 1.24 | 2.35 |
| CE-5 | 94 | 8.90 | 68.57 | — | — | 14.30 | 2.86 | 5.37 |
| CE-6 | 94 | 9.35 | 72.07 | — | — | 15.03 | 1.23 | 2.32 |
| CE-7 | 87 | 9.23 | 4.89 | 82.30 | — | — | 1.24 | 2.34 |
| CE-8 | 93 | 20.64 | 21.36 | 52.74 | 1.43 | 0.24 | 1.24 | 2.35 |

*) $C_{14/16/18}$ AMA was used instead of LMA
**) DMAEMA was used instead of PDA and randomly copolymerized Examples 1 to 6 are in accordance with the present invention and show varying amounts of macromonomer (MM) as well as varying ratios of LMA/nBMA which are within the claimed ranges. Example 4 contains a higher functionalization with MA and PDA than the other examples which all contain the same percentage of the functional monomers MA and PDA. Examples 5 and 6 were prepared with DIOS instead of Plastomoll DNA in the reaction mixture.

The comparative examples (CE) were either prepared without functional monomers (CE-1 and CE-2) or contain a different amine functionality like DMAEMA instead of MA and PDA (CE-3) or have different monomer compositions, e.g. do not contain Sty, nBMA or MMA or show monomer contents which are outside the claimed ranges (CE-4, CE-5, CE-6, CE-7, CE-8).

Table 3 summarizes the characteristics of additive compositions comprising examples and comparative examples (15% by weight of polymer in base oil). As base oil was used a Group III base oil mixture (NB 3043 and NB 3080 from Neste) with $KV_{100}$ of 4.9 cSt.

TABLE 3

Typical properties of the examples and comparative examples (CE).

| Polymer Example # | $KV_{100}$ [mm²/s] | $KV_{40}$ [mm²/s] | VI | $M_w$ [g/mol] | PDI | $KV_{100}$ shear loss [%] | $KV_{40}$ shear loss [%] |
|---|---|---|---|---|---|---|---|
| 1 | 6.82 | 27.49 | 224 | 482.000 | 4.57 | — | 2.58 |
| 2 | 6.98 | 27.94 | 228 | 316.000 | 4.36 | 0.16 | 2.02 |
| 3 | 7.75 | 28.30 | 266 | 320.000 | 3.6 | — | — |
| 4 | 6.42 | 30.42 | 171 | 348.000 | 4.05 | 0.49 | 19.75 |
| 5 | 6.62 | 27.31 | 214 | 359.000 | 3.85 | — | 3.29 |
| 6 | 7.05 | 27.64 | 236 | 348.000 | 3.66 | — | 2.14 |
| CE-1 | 7.66 | 28.22 | 262 | 309.000 | 4.26 | — | — |

TABLE 3-continued

Typical properties of the examples and comparative examples (CE).

| Polymer Example # | $KV_{100}$ [mm²/s] | $KV_{40}$ [mm²/s] | VI | $M_w$ [g/mol] | PDI | $KV_{100}$ shear loss [%] | $KV_{40}$ shear loss [%] |
|---|---|---|---|---|---|---|---|
| CE-2 | 6.57 | 27.53 | 208 | 198.000 | 3.25 | — | — |
| CE-3 | 6.66 | 27.05 | 219 | 295.000 | 4.46 | 1.04 | 1.18 |
| CE-4 | 6.21 | 27.14 | 190 | 214.000 | 3.29 | 0.30 | 0.17 |
| CE-5 | *⁾ | *⁾ | *⁾ | 437.000 | 4.23 | *⁾ | *⁾ |
| CE-6 | 12.41 | 50.28 | 255 | 526.000 | 5.34 | 64.05 | 61.14 |
| CE-7 | 6.36 | 27.48 | 196 | 283.000 | 3.92 | — | 0.85 |
| CE-8 | 9.82 | 34.01 | 294 | 330.000 | 4.16 | 22.25 | 12.98 |

*⁾ This product was not soluble in Group III base oil.

Table 3 shows that all polymers except for CE-5 were soluble in the Group III testing oil (which contains 22% by weight of API Group V oil selected from Plastomoll DNA or DIOS). CE-5 could not be dissolved in Group III oil or GTL4 oil. The high amount of polar monomers, like methyl methacrylate, and functional groups (MA and PDA) in this sample is probably the reason why the solvency of Group III oil might not be high enough for this product. As Group III oils and GTL oils are typically used for modern engine oils this candidate was considered to be not applicable in typical modern engine oil formulations.

The data in Table 3 further show that very high viscosity indexes (171-294) are obtained with the described comb polymer products and that the weight-average molecular weight ranged from 300.000 to 500.000 g/mol. For most samples, except for CE-6 and CE-8, very good shear stabilities were obtained as well.

In order to evaluate the properties of the examples and comparative examples in lubricating oil compositions, typical engine oil formulations without DI package were prepared and characterized. The detailed results of formulations which were adjusted to a $HTHS_{150}$ of 2.6 cSt are given in Table 4 below.

The $KV_{40}$ values are between 22 and 25 mm²/s and the $HTHS_{100}$ values are between 4.0 and 4.9 mPas; especially for the examples according to the present invention.

Low values of $KV_{40}$ and $HTHS_{100}$ are known to be indicators of very good fuel economy (see US 2010/0190671, page 1, paragraph [0005]). That means that the lubricating oil formulations according to the present invention can also be used to decrease fuel consumption.

Formulations A-12 and A-14 comprising polymer examples CE-6 and CE-8 do not show the advantageously low values of $KV_{40}$ and $HTHS_{100}$. Instead, it is shown that $KV_{40}$ and $HTHS_{100}$ are significantly higher for these samples and, therefore, no fuel economy advantage can be predicted for these additives.

Polymer Example CE-5 was not soluble in Yubase 4 and corresponding Formulation A-11 could therefore not be evaluated. As Yubase 4 or similar Group III oils are used for engine oil formulations polymer CE-5 is not suited for typical engine oil formulations. As already mentioned further above, the high amount of polar monomers, like methyl methacrylate, and functional groups (MA and PDA) in this sample is probably the reason why the solvency of Yubase 4 oil might not be high enough for this product.

TABLE 4

Characteristics of Formulation Examples A in a 0W20 engine oil formulation using Yubase 4 as base oil.

| Formulation # | Polymer Ex. # | Treat Rate [wt %] | $KV_{100}$ [mm²/s] | $KV_{40}$ [mm²/s] | VI | CCS-35 [mPas] | Noack [%] | $HTHS_{100}$ [mPas] | $HTHS_{150}$ [mPas] | Friction***⁾ (5-2000 mm/s) | Friction***⁾ (5-200 mm/s) |
|---|---|---|---|---|---|---|---|---|---|---|---|
| A-1 | 1 | 12.4 | 6.97 | 22.60 | 304 | 2223 | 14.1 | 4.19 | 2.80 | 32.9 | 4.8 |
| A-2 | 2 | 12.1 | 6.97 | 23.08 | 295 | 2255 | 14.1 | 4.32 | 2.76 | 33.4 | 5.0 |
| A-3 | 3 | 9.9 | 6.94 | 22.35 | 306 | 2187 | 13.9 | 4.22 | 2.73 | 38.6 | 6.0 |
| A-4 | 4 | 16.8 | 6.93 | 24.86 | 265 | 2366 | 14.4 | 4.85 | 2.70 | 30.8 | 4.3 |
| A-5 | 5 | 12.7 | 6.96 | 22.74 | 300 | 2279 | 13.8 | 4.25 | 3.01 | 35.1 | 5.8 |
| A-6 | 6 | 11.3 | 6.91 | 22.40 | 304 | 2238 | 13.7 | 4.22 | 2.83 | 33.5 | 5.5 |
| A-7*⁾ | CE-1 | 10.7 | 6.91 | 22.15 | 308 | 2198 | 14.5 | 4.41 | 2.72 | 50.5 | 7.8 |
| A-8*⁾ | CE-2 | 14.2 | 6.91 | 23.27 | 288 | 2306 | 14.6 | 4.82 | 3.03 | 53.2 | 9.0 |
| A-9*⁾ | CE-3 | 13.1 | 6.99 | 22.56 | 306 | 2162 | 14.8 | 4.42 | 2.86 | 60.0 | 10.1 |
| A-10*⁾ | CE-4 | 15.7 | 6.90 | 23.68 | 280 | 2317 | 13.7 | 4.83 | 3.09 | 40.0 | 7.8 |
| A-11*⁾ | CE-5 | **⁾ | **⁾ | **⁾ | **⁾ | **⁾ | **⁾ | **⁾ | **⁾ | **⁾ | **⁾ |
| A-12*⁾ | CE-6 | 8.6 | 9.62 | 35.19 | 276 | 2477 | 12.9 | 4.99 | 2.59 | 31.1 | 4.9 |
| A-13*⁾ | CE-7 | 14.3 | 6.90 | 24.28 | 271 | 2276 | 14.6 | 4.36 | 2.99 | 41.1 | 7.3 |
| A-14*⁾ | CE-8 | 8.5 | 7.89 | 25.11 | 318 | 2295 | 13.4 | 4.82 | 2.59 | 30.3 | 4.6 |

*⁾comparative example
**⁾ This product was not soluble in Yubase 4.
***⁾The area under the curve (traction coefficient versus mean speed) corresponds to the "total friction" or "friction" over the entire speed range examined and is a quantifiable result in which the friction can be expressed as a number.

From Table 4 it is clearly visible that formulations comprising the inventive comb polymers and most of the comparative comb polymers have low $KV_{40}$ and low high-temperature high-shear viscosities at 100° C. (see Formulations A-1 to A-10 and A-13).

In addition, it was found that by using the inventive comb polymers with grafted imide functionality surprisingly low values of friction loss can be achieved with corresponding formulations. Low friction loss as determined by MTM measurements means that with these formulations an additional benefit on fuel economy is expected because of the positive impact on the friction in the engine.

From Table 4 it is visible that all formulations comprising examples with imide functionality give very low friction losses (A-1 to A6 as well as A-12 and A-14) while the formulations comprising examples without dispersant functionality (A-7 and A-8) or with DMAEMA as dispersant functionality (A-9) show significantly higher friction losses. Surprisingly, also other formulations comprising polymers with imide functionality but different monomer compositions than the inventive examples could not obtain such low friction losses (A-10 and A-13).

Formulation example A-4 further shows that a higher amount of imide functionality leads to excellent friction data but $KV_{40}$ and $HTHS_{100}$ are raising as well.

The MTM results are further illustrated in FIG. 1.

A comparison of the inventive examples with the comparative examples shows that only in the formulations where the inventive comb polymers were used both low $KV_{40}$ and $HTHS_{100}$ values as well as low friction losses can be achieved. What means that superior fuel economy is expected for formulations wherein both mechanisms come to work: beneficial viscometric properties and low friction loss.

Engine Testing Results

Engine tests were conducted to show the fuel economy advantage of the friction reducing comb polymers and to therefore proof the expectations as mentioned further above. The formulations were adjusted to SAE 0W16 grade with Yubase 4+ as base oil (details listed in Table 5). In order to show the friction reducing effect of the invention a DI package without friction modifier (OLOA 55501 without FM) was chosen. One example using a polymer in accordance with the present invention (Formulation B-3 comprising polymer example 1) was compared with an example using a comparative polymer without friction reducing functionality (Formulation B-2, comprising polymer example CE-1).

TABLE 5

Details of the 0W16 formulations B used in fuel economy testing and fuel consumption results. The Formulations were blended a) with an inventive example (Ex 1) or b) with one of the Comparative Examples (CE-1, VPL ® 3-200 or Lubrizol ® 7077).

| SAE 0W-16 | | B-1*⁾ | B-2*⁾ | B-3 | B-4*⁾ |
|---|---|---|---|---|---|
| VI improver VPL ® 3-200 | [wt %] | 5.2 | — | — | — |
| Polymer Example CE-1 | [wt %] | — | 7.2 | — | — |
| Polymer Example 1 | [wt %] | — | — | 5.8 | — |
| Lubrizol 7077 | [wt %] | — | — | — | 4.3 |
| VPL ® 1-254 | [wt %] | — | — | — | 0.1 |
| OLOA 55501 without FM | [wt %] | 8.9 | 8.9 | 8.9 | 8.9 |
| Yubase 4 Plus | [wt %] | 85.9 | 83.9 | 85.3 | 86.7 |
| Total | [wt %] | 100 | 100 | 100 | 100 |
| $KV_{100}$ | [mm²/s] | 6.58 | 6.17 | 6.19 | 6.84 |
| $KV_{40}$ | [mm²/s] | 26.05 | 25.95 | 26.15 | 33.73 |
| VI | | 226 | 201 | 199 | 168 |
| $KV_{60}$ | [mm²/s] | 14.2 | 13.97 | 14.17 | 17.43 |
| CCS −35° C. | [mPas] | 3336 | 3431 | 3266 | 4107 |
| Noack 1h @250° C. | [%] | 12.3 | 12.3 | 12.2 | 12.3 |
| $HTHS_{80}$ | [mPas] | 6.71 | 6.65 | 6.71 | 7.38 |
| $HTHS_{100}$ | [mPas] | 4.56 | 4.44 | 4.51 | 4.94 |
| $HTHS_{150}$ | [mPas] | 2.35 | 2.37 | 2.42 | 2.37 |
| Yield Stress @−40° C. | [Pas] | <35 | <35 | <35 | <35 |
| MRV @−40° C. | [mPas] | 17400 | 30200 | 8800 | 33600 |
| After Bosch pump (30 cycles) | | | | | |
| $KV_{100}$ | [mm²/s] | 6.57 | 6.16 | 6.17 | 6.54 |
| $KV_{40}$ | [mm²/s] | 26.03 | 25.93 | 26.12 | 31.98 |
| VI | | 225 | 200 | 199 | 165 |
| $HTHS_{150}$ | [mPas] | 2.35 | 2.39 | 2.35 | 2.24 |
| After Bosch pump (90 cycles) | | | | | |
| $KV_{100}$ | [mm²/s] | 6.55 | 6.15 | 6.17 | 6.47 |
| $KV_{40}$ | [mm²/s] | 26.03 | 25.93 | 26.14 | 31.64 |
| VI | | 224 | 200 | 198 | 163 |
| $HTHS_{150}$ | [mPas] | 2.36 | 2.4 | 2.37 | 2.21 |
| Fuel Consumption | L/100 km | 8.958 | 8.943 | 8.932 | 9.046 |
| Fuel consumption change | [%] | 0 | −0.17 | −0.28 | 0.98 |
| Fuel Savings | L/100 km | 0 | −0.015 | −0.026 | 0.088 |

*⁾= comparative example

As standard was used a formulation comprising the commonly used viscosity index improver VPL® 3-200 which is a commercially available comb polymer from Evonik Industries AG (Formulation B-1).

It can be seen that by using a formulation which comprises an imide comb polymer in accordance with the present invention (B-3 comprising Polymer Example 1) significantly higher fuel economy is obtained (0.28% reduced fuel consumption) than by using a formulation comprising a conventional non-functionalized comb polymer (B-2 comprising CE-1, 0.17% reduced fuel consumption). These results show that the friction reducing functionality contributes to the fuel economy result and even increases fuel economy in comparison to the non-functionalized comb.

To show the superior fuel economy performance of the comb polymers an additional formulation containing Lubrizol® 7077, an olefin copolymer having an ethylene content of about 50 weight percent (commercially available from Lubrizol Corporation), as VI improver was evaluated (Formulation B-4). In this case 0.98% decreased fuel economy was observed in comparison to the viscosity improver VPL® 3-200 (commercially available from Evonik Industries AG).

CONCLUSION

Functionalizing selected polyalkyl(meth)acrylate based comb polymers with imide functions by grafting maleic anhydride on the base polymer followed by the reaction with the aromatic amine PDA the friction coefficient of lubricating oil compositions, especially 0W20 engine oil formulations, can be significantly reduced (see formulation examples A-1 to A-6). This effect is not observed when other base polymers are used or other functionalities are introduced to the comb polymers (see formulation examples A-7 to A-14). It was observed that only a low degree of branching of the comb polymer together with a small amount of imide functionality results in a significant reduction of friction. To balance the friction reducing effect good viscometric properties and solubility in Group III base oils like Nexbase 3043 or Yubase 4+ is necessary. It was further found that all 3 properties are only met when small amounts of imide are introduced and the polarity of the polymer backbone is increased. However, when the imide content is increased the solubility in the above-named oils is not guaranteed anymore (see additional example 1).

It was surprisingly found that those polymers which had the best viscometric properties in the formulations also exhibited the lowest traction coefficients, especially in the low speed regime. The imide functionalization therefore did not only lead to the targeted lower traction but in addition enabled the development of combs with improved viscometric performance which in the end resulted in improved FE in the engine.

It could be shown that adding dispersant property to a comb polymer has advantageous effects on fuel consumption due to the following features: 1) reducing friction, 2) improving viscometric properties like lowering $KV_{40}$ and $HTHS_{100}$.

These findings do especially mean that the addition of friction reducing property into a comb polymer enables the formulation of engine oils with at least reduced or even no friction modifier in the DI package of the engine oil formulation what at the end leads to cost savings.

The invention claimed is:

1. A grafted polyalkyl(meth)acrylate based comb polymer consisting of a base polymer A and units B which are grafted thereon, wherein the base polymer A comprises:
   (a) 10% to 25% by weight of at least one repeating unit derived from an ester of (meth)acrylic acid and a hydroxylated hydrogenated polybutadiene;
   (b) 0% to 2% by weight of at least one repeating unit derived from methyl (meth)acrylate;
   (c) 60% to 80% by weight of at least one repeating unit derived from butyl (meth)acrylate;
   (d) 0% to 16% by weight of at least one repeating unit derived from $C_{10-20}$-alkyl (meth)acrylate; and
   (e) 0% to 2% by weight of at least one repeating unit derived from a styrene monomer having 8 to 17 carbon atoms,
   wherein an amount of each component (a) to (e) is based on a total composition of the grafted polyalkyl(meth)acrylate based comb polymer;
   wherein the units B comprise at least one repeating unit prepared from:
   (f) 1% to 2.5% by weight of at least one repeating unit derived from polar unsaturated monomer selected from the group consisting of maleic acid, maleic acid anhydride, methyl maleic acid anhydride, maleic acid monoester and maleic acid diester; and
   (g) 2% to 5% by weight of at least one repeating unit derived from a primary amine of general formula (I)

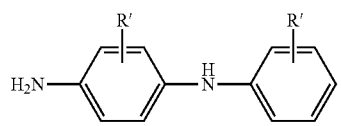

(I)

wherein each R' is independently selected from the group consisting of H and an alkyl radical having 1 to 9 carbon atoms, and
wherein the amount of each component (f) and (g) is based on the total composition of the grafted polyalkyl(meth)acrylate based comb polymer.

2. The rafted polyalkyl(meth)acrylate based comb polymer according to claim 1, comprising:
   (a) 10 to 15% by weight of the ester of (meth)acrylic acid and the hydroxylated hydrogenated polybutadiene;
   (b) 0% to 2% by weight of the methyl (meth)acrylate;
   (c) 65% to 76% by weight of the butyl (meth)acrylate;
   (d) 5% to 16% by weight of $C_{10-15}$ alkyl (meth)acrylate;
   (e) 0% to 2% by weight of the at least one styrene monomer having 8 to 17 carbon atoms;
   (f) 1% to 2.5% by weight of the at least one polar unsaturated monomer selected from the group consisting of maleic acid, maleic acid anhydride, methyl maleic acid anhydride, maleic acid monoester and maleic acid diester; and
   (g) 2% to 5% by weight of the primary amine of the following general formula (I)

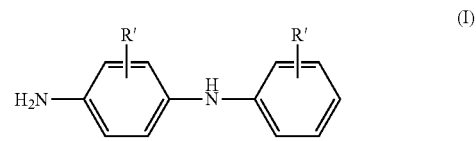

(I)

wherein each R' independently selected from the group consisting of H and an alkyl radical having 1 to 9 carbon atoms.

3. The grafted polyalkyl(meth)acrylate based comb polymer according to claim 1, wherein the polar unsaturated monomer is maleic acid anhydride.

4. The grafted polyalkyl(meth)acrylate based comb polymer according to claim 1, wherein the primary amine of general formula (I) is N-phenyl-1,4-phenylenediamine.

5. The grafted polyalkyl(meth)acrylate based comb polymer according to claim 1, wherein the grafted polyalkyl(meth)acrylate based comb polymer has a weight-average molecular weight in the range of from 200,000 to 600,000 g/mol.

6. The rafted polyalkyl(meth)acrylate based comb polymer according to claim 1, wherein the hydroxylated hydrogenated polybutadiene has a number-average molecular weight $M_n$ to DIN 55672-1 of 4,000 to 6,000 g/mol.

7. The grafted polyalkyl(meth)acrylate based comb polymer according to claim 6, wherein the number-average molecular weight $M_n$ to DIN 55672-1 is 4,500 to 5,000 g/mol.

8. A method for reducing friction losses of a lubricating oil composition, the method comprising:
   adding the polyalkyl(meth)acrylate based comb polymer according to claim 1 to the lubricating oil composition.

9. The method according to claim 8, wherein the lubricating oil composition is an engine oil composition.

10. The grafted polyalkyl(meth)acrylate based comb polymer according to claim 1, wherein the butyl (meth)acrylate is n-butyl methacrylate, the $C_{10-20}$-alkyl (meth)acrylate is $C_{12-14}$-alkyl methacrylate, and the styrene monomer is styrene.

11. An additive composition, comprising:
   (A) a first base oil selected from the group consisting of API Group III oils and mixtures thereof;
   (B) a second base oil selected from the group consisting of API Group V base oils and mixtures thereof; and (C) a polyalkyl(meth)acrylate based comb polymer consisting of a base polymer A and units B which is grafted thereon, wherein the base polymer A comprises:
  (a) 10% to 25% by weight of at least one repeating unit derived from an ester of (meth)acrylic acid and a hydroxylated hydrogenated polybutadiene:
  (b) 0% to 2% by weight of at least one repeating unit derived from methyl (meth)acrylate:
  (c) 60% to 80% by weight of at least one repeating unit derived from butyl (meth)acrylate;
  (d) 0% to 16% by weight of at least one repeating unit derived from $C_{10-20}$-alkyl (meth)acrylate; and
  (e) 0% to 2% by weight of at least one repeating unit derived from a styrene monomer having 8 to 17 carbon atoms,
  wherein an amount of each component (a) to (e) is based on a total composition of the polyalkyl(meth)acrylate based comb polymer; and
  wherein the units B comprise at least one repeating unit prepared from:
  (f) 1% to 2.5% by weight of at least one repeating unit derived from a polar unsaturated monomer selected from the group consisting of maleic acid, maleic acid anhydride, methyl maleic acid anhydride, maleic acid monoester and maleic acid diester; and
  (g) 2% to 5% by weight of at least one repeating unit derived from a primary amine of general formula (I)

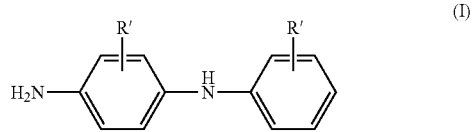

(I)

wherein each R' is independently selected from the group consisting of H and an alkyl radical having 1 to 9 carbon atoms, and
  wherein the amount of each component (f) and (g) is based on the total composition of the polyalkyl (meth)acrylate based comb polymer.

12. The additive composition according to claim 11, comprising:
  (A) the first base oil selected from the group consisting of API Group III oils and mixtures thereof:
  (B) the second base oil selected from the group consisting of API Group V base oils and mixtures thereof; and
  (C) the polyalkyl(meth)acrylate based comb polymer consisting of the base polymer A and units B which is grafted thereon, wherein the base polymer A comprises:
    (a) 10% to 15% by weight of at least one repeating unit derived from the an ester of (meth)acrylic acid and a hydroxylated hydrogenated polybutadiene;
    (b) 0% to 2% by weight of at least one repeating unit derived from h methyl (meth)acrylate;
    (c) 65% to 76% by weight of at least one repeating unit derived from the butyl (meth)acrylate;
    (d) 5% to 16% by weight of at least one repeating unit derived from the $C_{10-20}$-alkyl (meth)acrylate; and
    (e) 0% to 2% by weight of at least one repeating unit derived from the styrene monomers having 8 to 17 carbon atoms,
    wherein the amount of each component (a) to (e) is based on the total composition of the polyalkyl (meth)acrylate based comb polymer; and
  wherein the units B comprise at least one repeating unit prepared from:
    (f) 1% to 2.5% by weight of at least one repeating unit derived from the polar unsaturated monomer selected from the group consisting of maleic acid, maleic acid anhydride, methyl maleic acid anhydride, maleic acid monoester and maleic acid diester; and
    (g) 2% to 5% by weight of at least one repeating unit derived from the primary amine of general formula (I)

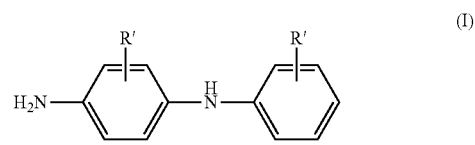

(I)

wherein each R' is independently selected from the group consisting of H and an alkyl radical having 1 to 9 carbon atoms,
  wherein the amount of each component (f) and (g) is based on the total composition of the polyalkyl (meth)acrylate based comb polymer.

13. The additive composition according to claim 11, comprising:
  (A) 0% to 40% by weight of the first base oil selected from the group consisting of API Group III base oils and mixtures thereof;
  (B) 20% to 80% by weight of the second base oil selected from the group consisting of API Group V base oils and mixtures thereof; and
  (C) 20% to 40% by weight of the polyalkyl(meth)acrylate based comb polymer, based on a total weight of the additive composition.

14. A method of reducing friction coefficient of a lubricating oil composition, the method comprising:
  adding the additive composition according to claim 11 to a lubricating oil composition.

15. The additive composition according to claim 11, wherein the second base oil is at least one oil selected from the group consisting of ester oils, diisononyl adipate, dioctylsebacate and mixtures thereof.

16. A lubricating oil composition, comprising:
  (A) 60% to 99% by weight of a first base oil selected from the group consisting of API Group I, API Group II, API Group III, API Group IV oils and mixtures thereof;
  (B) 0.25% to 15% by weight of a second base oil selected from the group consisting of API Group V base oils and mixtures thereof; and
  (C) 0.5% to 10% by weight of a polyalkyl(meth)acrylate based comb polymer consisting of a base polymer A and units B which are grafted thereon, wherein the base polymer A comprises:
    (a) 10% to 25% by weight of at least one repeating unit derived from an ester of (meth)acrylic acid and a hydroxylated hydrogenated polybutadiene:
    (b) 0% to 2% by weight of at least one repeating unit derived from methyl (meth)acrylate;
    (c) 60% to 80% by weight of at least one repeating unit derived from butyl (meth)acrylate;
    (d) 0% to 16% by weight of at least one repeating unit derived from at least one $C_{10-20}$-alkyl (meth)acrylate; and (e) 0% to 2% by weight of at least one repeating unit derived from at least one styrene monomer having 8 to 17 carbon atoms, wherein an amount of each component (a) to (e) is based on a total composition of the polyalkyl(meth)acrylate based comb polymer;

wherein the units B comprise at least one repeating unit prepared from:

(f) 1% to 2.5% by weight of at least one repeating unit derived from a polar unsaturated monomer selected from the group consisting of maleic acid, maleic acid anhydride, methyl maleic acid anhydride, maleic acid monoester and maleic acid diester; and (g) 2% to 5% by weight of at least one repeating nit derived from a primary amine of general formula (I)

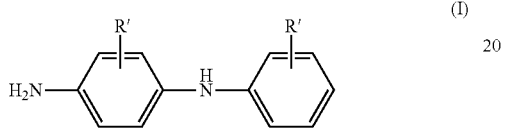

(I)

wherein each R' is independently selected from the group consisting of H and an alkyl radical having 1 to 9 carbon atoms, wherein the amount of each component (f) and (g) is based on the total composition of the polyalkyl(meth)acrylate based comb polymer; and (D) 0% to 15% by weight of one or more further additives.

17. The lubricating oil composition according to claim 16, comprising:

(A) 60% to 99% by weight of the first base oil selected from the group consisting of API Group I, API Group II, API Group III, API Group IV oils and mixtures thereof;

(B) 0.25% to 15% by weight of the second base oil selected from the group consisting of API Group V base oils and mixtures thereof; and (C) 0.5% to 10% by weight of the polyalkyl(meth)acrylate based comb polymer consisting of the base polymer A and the units B which are grafted thereon, wherein the base polymer A comprises:

(a) 10% to 15% by weight of at least one repeating unit derived from the ester of (meth)acrylic acid and a hydroxylated hydrogenated polybutadiene;

(b) 0% to 2% by weight of at least one repeating unit derived from the methyl (meth)acrylate;

(c) 65% to 76% by weight of at least one repeating unit derived from the butyl (meth)acrylate;

(d) 5% to 16% by weight of at least one repeating unit derived from the at least one $C_{10\text{-}20}$-alkyl (meth)acrylate; and (e) 0% to 2% by weight of at least one repeating unit derived from the styrene monomer having 8 to 17 carbon atoms, wherein the amount of each component (a) to (e) is based on the total composition of the polyalkyl(meth)acrylate based comb polymer; and wherein the units B comprise at least one repeating unit prepared from:

(f) 1% to 2.5% by weight of at least one repeating unit derived from the polar unsaturated monomer selected from the group consisting of maleic acid, maleic acid anhydride, methyl maleic acid anhydride, maleic acid monoester and maleic acid diester; and (g) 2% to 5% by weight of at least one repeating unit derived from h primary amine of general formula (I)

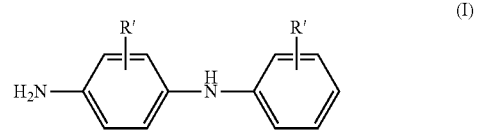

(I)

wherein each R' is independently selected from the group consisting of H and an alkyl radical having 1 to 9 carbon atoms, wherein the amount of each component (f) and (g) is based on the total composition of the polyalkyl(meth)acrylate based comb polymer, and (D) 0% to 15% by weight of t one or more further additives.

18. The lubricating oil composition according to claim 16, wherein the one or more further additives is selected from the group consisting of viscosity index improvers, dispersants, defoamers, detergents, antioxidants, pour point depressants, antiwear additives, extreme pressure additives, friction modifiers, anticorrosion additives, dyes and mixtures thereof.

19. A method of reducing friction in an automotive vehicle, the method comprising:

applying the lubricating oil composition according to claim 16 to an automotive vehicle.

* * * * *